US012061436B2

(12) United States Patent
Sato

(10) Patent No.: US 12,061,436 B2
(45) Date of Patent: *Aug. 13, 2024

(54) IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,924

(22) Filed: Jul. 10, 2023

(65) Prior Publication Data

US 2023/0350335 A1 Nov. 2, 2023

Related U.S. Application Data

(63) Continuation of application No. 17/823,059, filed on Aug. 29, 2022, now Pat. No. 11,740,582, which is a continuation of application No. 17/372,395, filed on Jul. 9, 2021, now Pat. No. 11,448,997.

(30) Foreign Application Priority Data

Jul. 10, 2020 (JP) ................................ 2020-119498

(51) Int. Cl.

| | |
|---|---|
| ***G03G 21/10*** | (2006.01) |
| ***G03G 21/12*** | (2006.01) |
| ***G03G 21/16*** | (2006.01) |
| ***G03G 21/18*** | (2006.01) |

(52) U.S. Cl.

CPC ........... *G03G 21/105* (2013.01); *G03G 21/12* (2013.01); *G03G 21/1623* (2013.01); *G03G 21/1676* (2013.01); *G03G 21/1842* (2013.01); *G03G 2221/1869* (2013.01)

(58) Field of Classification Search

CPC .. G03G 15/0865; G03G 21/10; G03G 21/105; G03G 21/16; G03G 21/1623; G03G 21/1671; G03G 2221/1869

See application file for complete search history.

(56) References Cited

U.S. PATENT DOCUMENTS

| | | | |
|---|---|---|---|
| 10,976,699 | B2 | 4/2021 | Sato |
| 11,156,955 | B2 | 10/2021 | Sato |
| 11,448,997 | B2 | 9/2022 | Sato |
| 2015/0147088 | A1 | 5/2015 | Sato et al. |
| 2015/0277344 | A1 | 10/2015 | Hashimoto et al. |
| 2016/0291528 | A1 | 10/2016 | Hashimoto et al. |
| 2020/0073315 | A1 | 3/2020 | Sato et al. |
| 2020/0089160 | A1 | 3/2020 | Fujii et al. |

FOREIGN PATENT DOCUMENTS

| | | | |
|---|---|---|---|
| JP | 2015-102721 | A | 6/2015 |
| JP | 2015-194652 | A | 11/2015 |
| JP | 2016-194585 | A | 11/2016 |
| JP | 2020-034700 | A | 3/2020 |
| JP | 2020-042244 | A | 3/2020 |

*Primary Examiner* — Gregory H Curran

(74) *Attorney, Agent, or Firm* — KENEALY VAIDYA LLP

(57) ABSTRACT

An image forming apparatus includes a main body housing, a drawer, a drum cartridge, and a toner cartridge. The drawer includes a waste toner conveying pipe and a lock member. In a state where the toner cartridge is mounted on the drum cartridge, the drum cartridge is mounted on the drawer, the drawer is located at a drawn-out position, and the lock member is located at a lock position, the toner cartridge is detachable from the drum cartridge.

15 Claims, 18 Drawing Sheets

IMAGE FORMING APPARATUS

CROSS-REFERENCE TO RELATED APPLICATIONS

This application is a continuation of and claims priority under 35 U.S.C. § 120 to co-pending U.S. patent application Ser. No. 17/823,059 filed Aug. 29, 2022, which claims priority to U.S. patent application Ser. No. 17/372,395 filed Jul. 9, 2021 which issued as U.S. Pat. No. 11,448,997 on Sep. 20, 2022, the entire disclosures of which are hereby incorporated by reference, which in turn is based upon and claims the benefit of priority under 35 U.S.C. § 119 to prior Japanese patent application No. 2020-119498, filed on Jul. 10, 2020, the entire contents of which are incorporated herein by reference.

TECHNICAL FIELD

The present disclosure relates to an image forming apparatus.

BACKGROUND ART

In related art, an image forming apparatus includes a main body housing, a drawer, a drum cartridge and a toner cartridge. The drum cartridge is mountable on the drawer. The drum cartridge includes a photosensitive drum. The toner cartridge is capable of accommodating toner supplied to the photosensitive drum. The toner cartridge is mountable on the drum cartridge.

The drawer includes a waste toner conveying pipe and a waste toner shutter. The waste toner conveying pipe has a waste toner receiving port. The waste toner receiving port is capable of receiving waste toner from the drum cartridge mounted on the drawer. The waste toner conveying pipe allows passage of the waste toner. The waste toner shutter opens and closes the waste toner receiving port.

In the image forming apparatus as disclosed in the related art, in a case where the toner cartridge is replaced with respect to the drum cartridge mounted on the drawer, when the toner cartridge is detached from the drum cartridge, the drum cartridge may move together with the toner cartridge, and the drum cartridge and the waste toner conveying pipe may become disconnected.

If the drum cartridge and the waste toner conveying pipe become disconnected during replacement of the toner cartridge, waste toner may leak from a connecting portion between the drum cartridge and the waste toner conveying pipe.

SUMMARY

An aspect of the present disclosure provides an image forming apparatus capable of preventing leakage of waste toner from a connecting portion between a drum cartridge and a waste toner conveying pipe in a case where a toner cartridge is replaced with respect to the drum cartridge mounted on a drawer.

According to an aspect of the present disclosure, there is provided an image forming apparatus including: a main body housing; a drum cartridge including a photosensitive drum and a drum frame supporting the photosensitive drum; and a toner cartridge capable of accommodating toner to be supplied to the photosensitive drum, the toner cartridge being mountable on the drum cartridge; and a drawer movable between an accommodated position where the drawer is accommodated in the main body housing and a drawn-out position where the drawer is drawn out from the main body housing, the drum cartridge being mountable on the drawer, and the drawer including: a waste toner conveying pipe having a waste toner receiving port capable of receiving waste toner from the drum cartridge mounted on the drawer, the waste toner conveying pipe allowing passage of the waste toner therethrough; a lock member movable between a lock position where the lock member locks the drum cartridge to the drawer and an unlock position where the lock member unlocks the drum cartridge from the drawer; and a first waste toner shutter movable between a first closed position where the first waste toner shutter closes the waste toner receiving port and a first open position where the waste toner receiving port is opened, the first waste toner shutter moving from the first closed position to the first open position as the lock member moves from the unlock position to the lock position, and the first waste toner shutter moving from the first open position to the first closed position as the lock member moves from the lock position to the unlock position.

DESCRIPTION OF EMBODIMENTS

1. Image Forming Apparatus 1

An outline of an image forming apparatus 1 will be described with reference to FIGS. 1 and 2.

Figure 1:
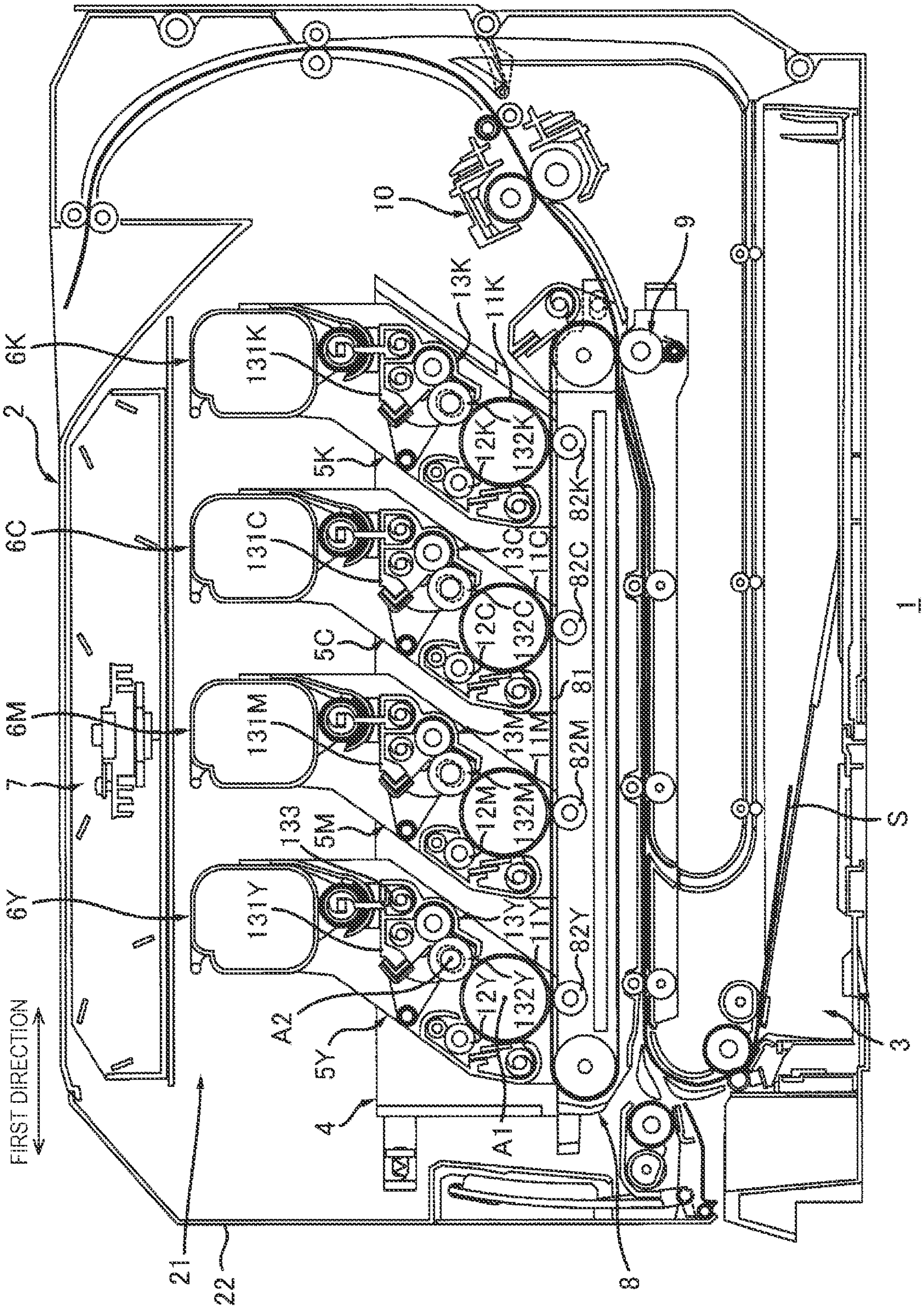
FIG. 1 is a schematic configuration view of an image forming apparatus.

As shown in FIG. 1, the image forming apparatus 1 includes a main body housing 2, a sheet cassette 3, a drawer 4, a plurality of drum cartridges 5Y, 5M, 5C, 5K, a plurality of toner cartridges 6Y, 6M, 6C, 6K, an exposure device 7, a belt unit 8, a transfer roller 9 and a fixing device 10.

1.1 Main Body Housing 2

The main body housing 2 accommodates the sheet cassette 3, the drawer 4, the plurality of drum cartridges 5Y, 5M, 5C, 5K, the plurality of toner cartridges 6Y, 6M, 6C, 6K, the exposure device 7, the belt unit 8, the transfer roller 9 and the fixing device 10. The main body housing 2 has an opening 21. The main body housing 2 includes a cover 22.

The opening 21 is located on one side wall of the main body housing 2 in a first direction.

Figure 2:
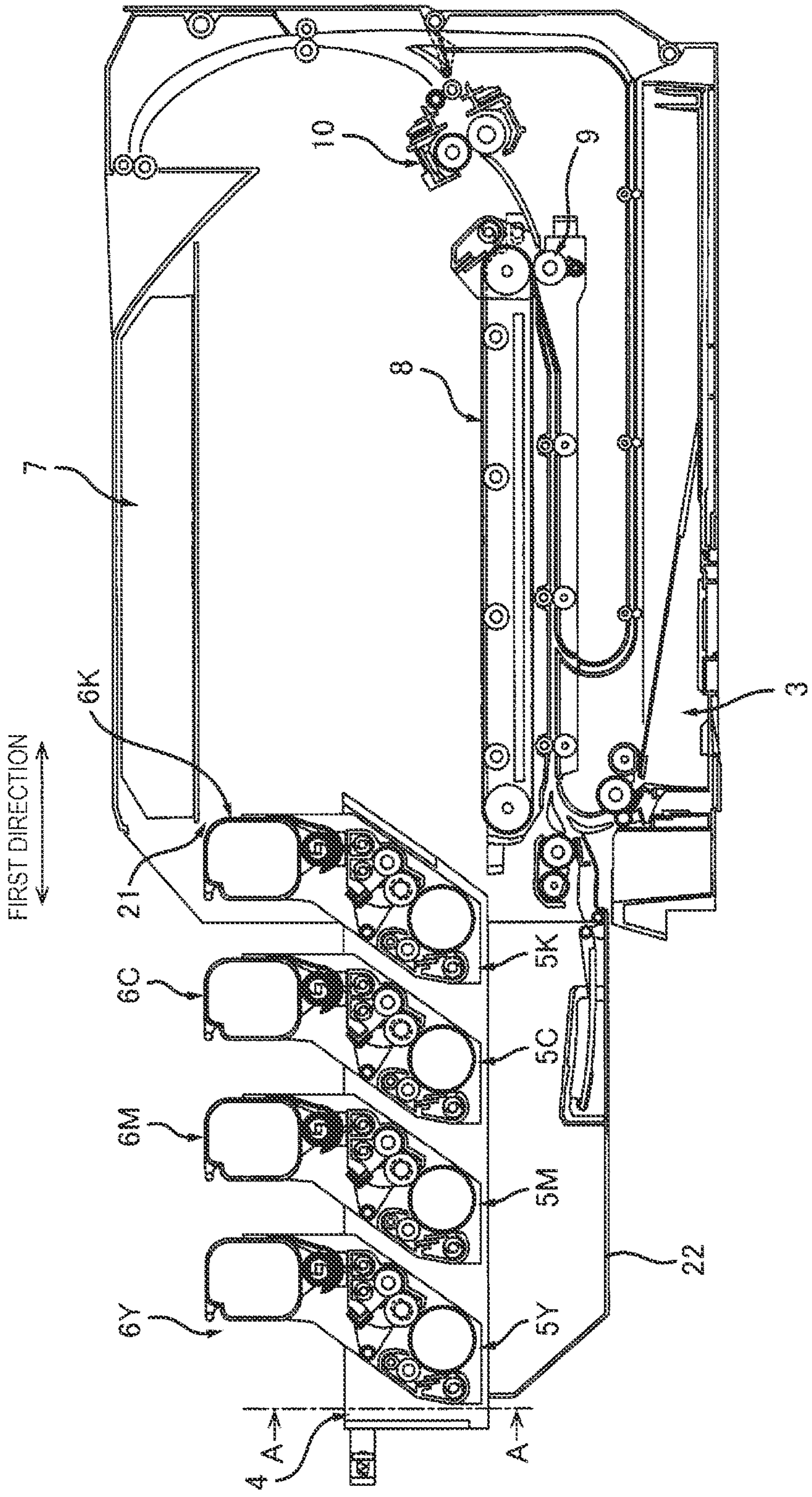
FIG. 2 is an explanatory view explaining movement of a drawer shown in FIG. 1, showing a state where a cover is located at a cover open position and the drawer is located at a drawn-out position.

The cover 22 is movable between a cover closed position (see FIG. 1) and a cover open position (see FIG. 2). As shown in FIG. 1, when the cover 22 is located at the cover closed position, the cover 22 closes the opening 21. As shown in FIG. 2, when the cover 22 is located at the cover open position, the opening 21 is opened.

1.2 Sheet Cassette 3

As shown in FIG. 1, the sheet cassette 3 is capable of accommodating a sheet S. The sheet S in the sheet cassette 3 is conveyed toward the transfer roller 9.

1.3 Drawer 4

As shown in FIG. 2, in a state where the cover 22 is located at the cover open position, the drawer 4 is movable in the first direction between an accommodated position (see FIG. 1) and a drawn-out position (see FIG. 2) through the opening 21. As shown in FIG. 1, in a state where the drawer 4 is located at the accommodated position, the entire drawer 4 is accommodated in the main body housing 2. As shown in FIG. 2, in a state where the drawer 4 is located at the drawn-out position, at least a part of the drawer 4 is drawn out from the main body housing 2.

1.4 Plurality of Drum Cartridge 5Y, 5M, 5C, 5K

Each of the plurality of drum cartridges 5Y, 5M, 5C, 5K is mountable on the drawer 4. Specifically, each of the plurality of drum cartridges 5Y, 5M, 5C, 5K is mountable on the drawer 4 in the state where the drawer 4 is located at the drawn-out position. The plurality of drum cartridges 5Y, 5M, 5C, 5K have the same structure. In the following description, the drum cartridge 5Y will be described, and description of the drum cartridges 5M, 5C, 5K will be omitted.

As shown in FIG. 1, the drum cartridge 5Y includes a photosensitive drum 11Y, a charging device 12Y, and a developing device 13Y.

1.4.1 Photosensitive Drum 11Y

The photosensitive drum 11Y extends in a second direction. In a state where the drum cartridge 5Y is mounted on the drawer 4, the second direction intersects with the first direction. Preferably, in the state where the drum cartridge 5Y is mounted on the drawer 4, the second direction is orthogonal to the first direction. The photosensitive drum 11Y is rotatable about a drum axis A1. The drum axis A1 extends in the second direction.

1.4.2 Charging Device 12Y

The charging device 12Y charges a circumferential surface of the photosensitive drum 11Y. In the present embodiment, the charging device 12Y is a charging roller. The charging device 12Y may be a scorotron-type charger.

1.4.3 Developing Device 13Y

The developing device 13Y is capable of supplying toner to the photosensitive drum 11Y. Specifically, the developing device 13Y includes a developing housing 131Y and a developing roller 132Y.

1.4.3.1 Developing Housing 131Y

The developing housing 131Y is capable of accommodating the toner from the toner cartridge 6Y. The developing housing 131Y has a developing opening 133. The toner from the toner cartridge 6Y enters the developing housing 131Y through the developing opening 133. The developing housing 131Y supports the developing roller 132Y.

1.4.3.2 Developing Roller 132Y

The developing roller 132Y is capable of supplying the toner in the developing housing 131Y to the photosensitive drum 11Y. The developing roller 132Y comes into contact with the photosensitive drum 11Y. The developing roller 132Y may be separable from the photosensitive drum 11Y. The developing roller 132Y extends in the second direction. The developing roller 132Y is rotatable about a developing axis A2. In a state where the toner cartridge 6Y is mounted on the drum cartridge 5Y, the developing axis A2 extends in the second direction.

1.6 Plurality of Toner Cartridge 6Y, 6M, 6C, 6K

The toner cartridge 6Y is capable of accommodating the toner to be supplied to the photosensitive drum 11Y. The toner cartridge 6Y is mountable on the drum cartridge 5Y. In the state where the toner cartridge 6Y is mounted on the drum cartridge 5Y, the toner cartridge 6Y is capable of supplying the toner to the developing device 13Y.

The toner cartridge 6M accommodates toner to be supplied to a photosensitive drum 11M. The toner cartridge 6M is mountable on the drum cartridge 5M. In a state where the toner cartridge 6M is mounted on the drum cartridge 5M, the toner cartridge 6M is capable of supplying the toner to a developing device 13M.

The toner cartridge 6C accommodates toner to be supplied to a photosensitive drum 11C. The toner cartridge 6C is mountable on the drum cartridge 5C. In a state where the toner cartridge 6C is mounted on the drum cartridge 5C, the toner cartridge 6C is capable of supplying the toner to a developing device 13C.

The toner cartridge 6K accommodates toner to be supplied to a photosensitive drum 11K. The toner cartridge 6K is mountable on the drum cartridge 5K. In a state where the toner cartridge 6K is mounted on the drum cartridge 5K, the toner cartridge 6K is capable of supplying the toner to a developing device 13K.

1.7 Exposure Device 7

In a state where the drum cartridges 5Y, 5M, 5C, 5K are mounted on the drawer 4 and the drawer 4 is located at the accommodated position, the exposure device 7 is capable of exposing circumferential surfaces of the photosensitive drums 11Y, 11M, 11C, 11K. In the present embodiment, the exposure device 7 is a laser scanning unit.

1.8 Belt Unit 8

In the state where the drum cartridges 5Y, 5M, 5C, 5K are mounted on the drawer 4 and the drawer 4 is located at the accommodated position, the belt unit 8 is located below the drum cartridges 5Y, 5M, 5C, 5K. The belt unit 8 includes an intermediate transfer belt 81 and transfer rollers 82Y, 82M, 82C, 82K.

In the state where the drum cartridges 5Y, 5M, 5C, 5K are mounted on the drawer 4 and the drawer 4 is located at the accommodated position, the intermediate transfer belt 81 is in contact with the photosensitive drums 11Y, 11M, 11C, 11K.

The transfer roller 82Y transfers the toner on the photosensitive drum 11Y to the intermediate transfer belt 81. The transfer roller 82M transfers the toner on the photosensitive drum 11M to the intermediate transfer belt 81. The transfer roller 82C transfers the toner on the photosensitive drum 11C to the intermediate transfer belt 81. The transfer roller 82K transfers the toner on the photosensitive drum 11K to the intermediate transfer belt 81.

1.9 Transfer Roller 9

The transfer roller 9 transfers the toner on the intermediate transfer belt 81 to the sheet S. Specifically, the sheet S conveyed from the sheet cassette 3 toward the transfer roller 9 is conveyed to the fixing device 10 through the transfer roller 9 and the intermediate transfer belt 81. At this time, the transfer roller 9 transfers the toner on the intermediate transfer belt 81 to the sheet S.

1.10 Fixing Device 10

The fixing device 10 fixes the toner to the sheet S by heating and pressurizing the sheet S to which the toner is transferred. The sheet S that has passed through the fixing device 10 is discharged to an upper surface of the main body housing 2.

2. Details of Drum Cartridge 5Y

Next, the drum cartridge 5Y will be described in detail with reference to FIGS. 3 to 8.

A "first direction" in the following description of the drum cartridge 5Y is the "first direction" "in the state where the drum cartridge 5Y is mounted on the drawer 4".

Figure 3:
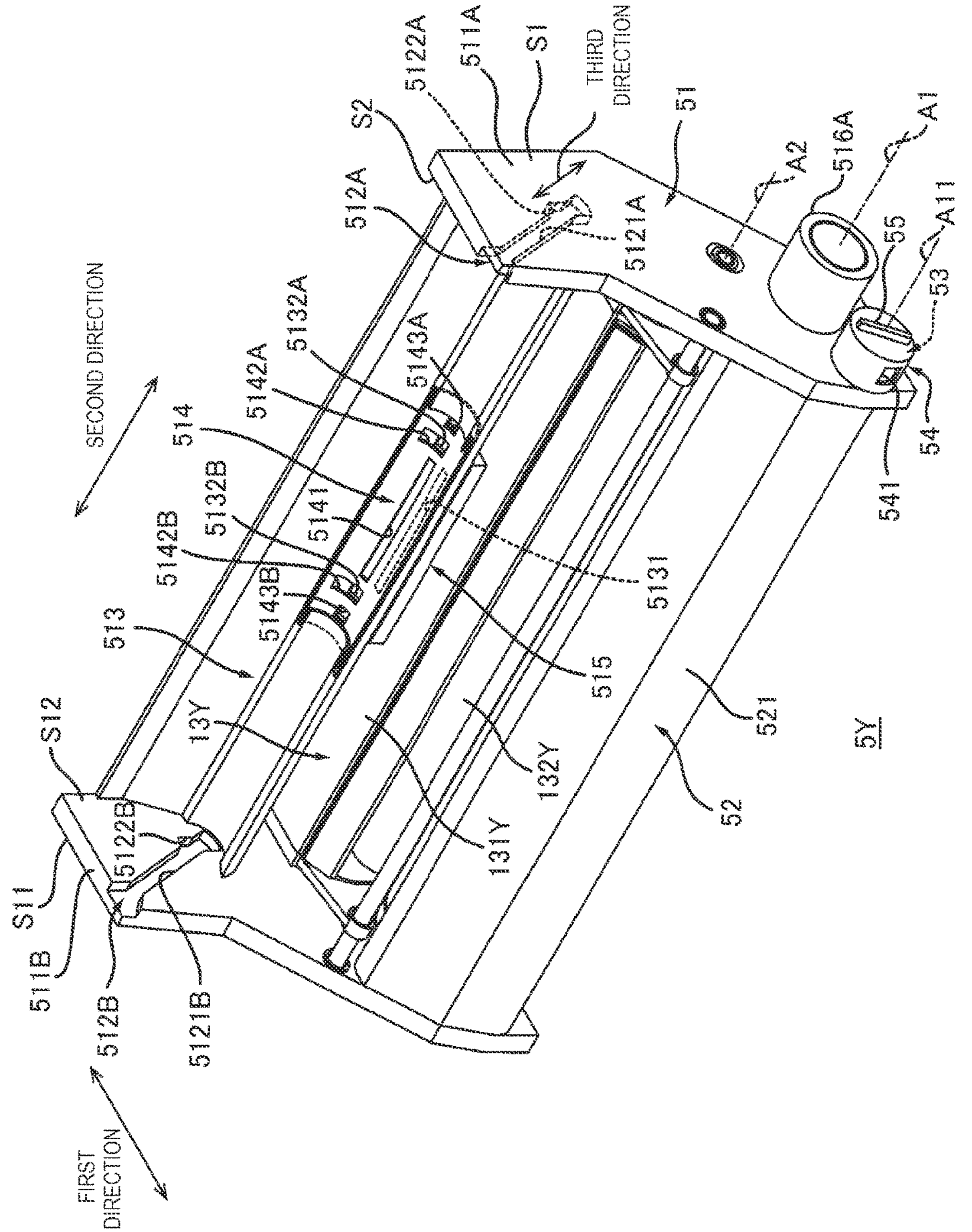
FIG. 3 is a perspective view of a drum cartridge, showing a state where a toner shutter of the drum cartridge is located at a closed position and a waste toner shutter of the drum cartridge is located at a closed position.

As shown in FIG. 3, the drum cartridge 5Y includes a drum frame 51, a drum cleaner 52, a waste toner discharge portion 53, a waste toner shutter 54 and an engagement portion 55 in addition to the photosensitive drum 11Y, the charging device 12Y and the developing device 13Y.

2.1 Drum Frame 51

The drum frame 51 supports the photosensitive drum 11Y, the charging device 12Y, the developing device 13Y and the drum cleaner 52.

Figure 8:
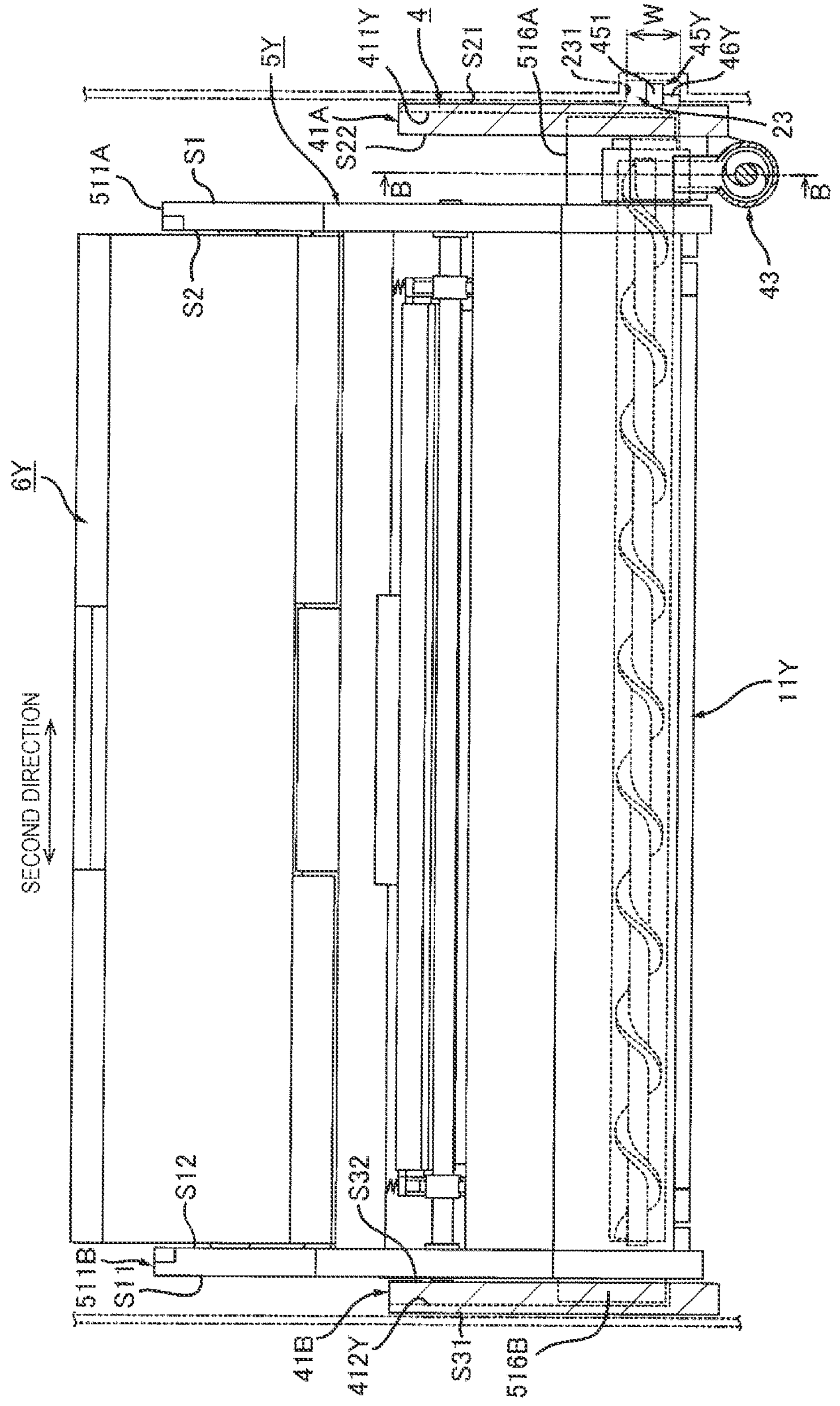
FIG. 8 is a cross-sectional view taken along a line A-A of the drawer shown in FIG. 2.

The drum frame 51 includes drum side plates 511A, 511B, toner guides 512A, 512B, a receiving portion 513, a toner shutter 514, a seal member 515, and cylindrical portions 516A, 516B (see FIG. 8).

2.1.1 Drum Side Plates 511A, 511B

The drum side plate 511A is located at one end portion of the drum cartridge 5Y in the second direction. The drum side plate 511A has an outer surface S1 and an inner surface S2. The inner surface S2 is located between the outer surface S1 and the drum side plate 511B in the second direction.

The drum side plate 511B is located at the other end portion of the drum cartridge 5Y in the second direction. The drum side plate 511B is located away from the drum side plate 511A in the second direction. The drum side plate 511B has an outer surface S11 and an inner surface S12. The inner surface S12 is located between the outer surface S11 and the drum side plate 511A in the second direction.

2.1.2 Toner Guides 512A, 512B

The toner guide 512A is located on the inner surface S2 of the drum side plate 511A. The toner guide 512A is located on a side opposite to the developing device 13Y with respect to the receiving portion 513. The toner guide 512A is a recessed groove. The toner guide 512A includes a guide portion 5121A and a lock portion 5122A.

The guide portion 5121A extends in a third direction. The third direction intersects with the first direction and the second direction. Specifically, the third direction intersects with the first direction and is orthogonal to the second direction. When the toner cartridge 6Y is mounted on the drum cartridge 5Y, the guide portion 5121A guides a protrusion 62A of the toner cartridge 6Y (see FIG. 14). The protrusion 62A will be described later. The guide portion 5121A has one end portion in the third direction and the other end portion in the third direction. The other end portion of the guide portion 5121A is located between the one end portion of the guide portion 5121A and the receiving portion 513 in the third direction.

The lock portion 5122A is located at the other end portion of the guide portion 5121A. The lock portion 5122A extends in a direction intersecting with the third direction. The lock portion 5122A extends in a direction orthogonal to the first direction and the second direction.

The toner guide 512B is located on the inner surface S12 of the drum side plate 511B. The toner guide 512B includes a guide portion 5121B and a lock portion 5122B. The guide portion 5121B has a shape the same as that of the guide portion 5121A. The lock portion 5122B has a shape the same as that of the lock portion 5122A. When the toner cartridge 6Y is mounted on the drum cartridge 5Y, the guide portion 5121B guides a protrusion 62B of the toner cartridge 6Y (see FIG. 14). The protrusion 62B will be described later.

2.1.3 Receiving Portion 513

Figure 14:
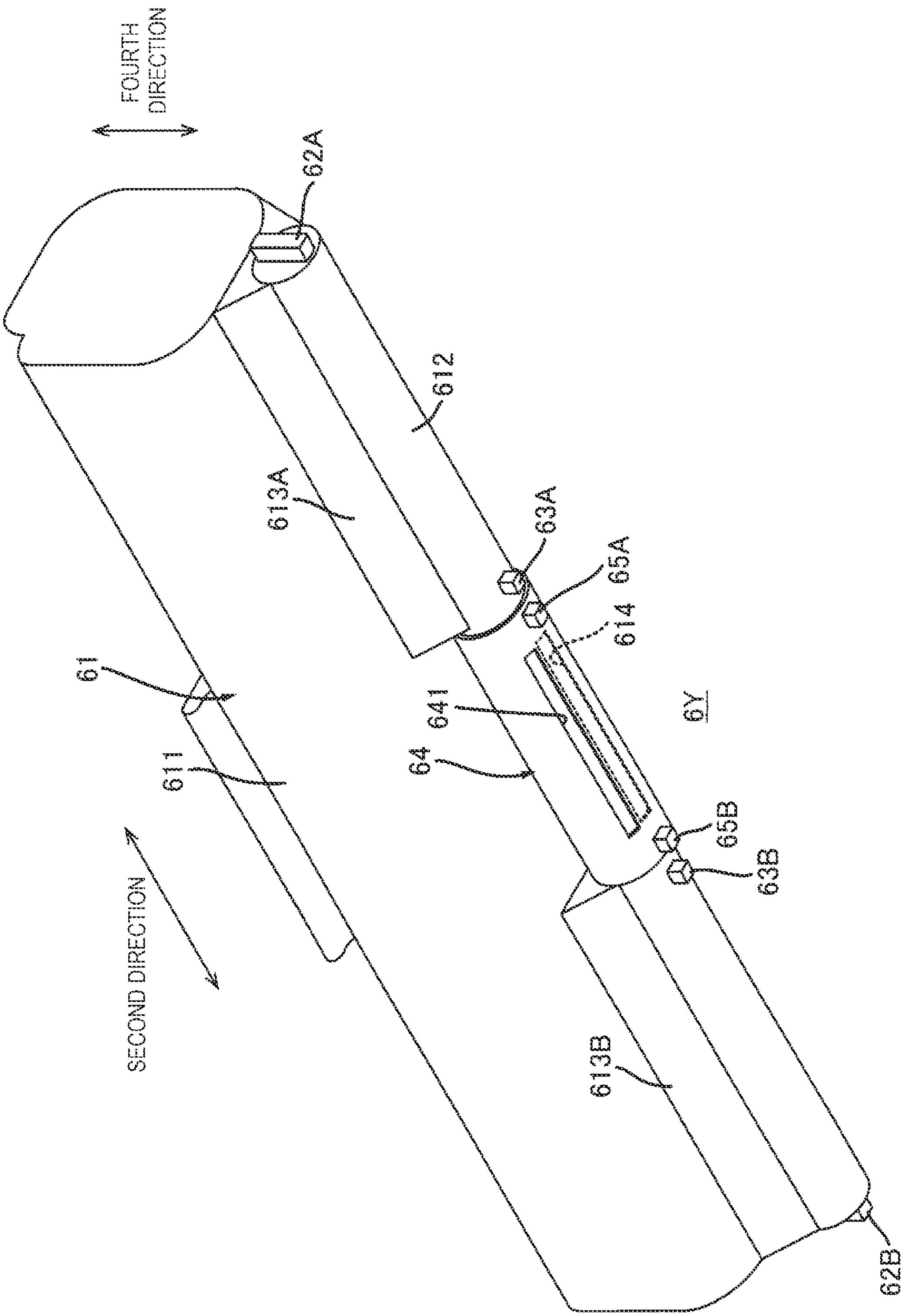
FIG. 14 is a perspective view of a toner cartridge, showing a state where a toner shutter of the toner cartridge is located at a closed position.

In a state where the toner cartridge 6Y is supported by the drum cartridge 5Y, the receiving portion 513 receives a second accommodating portion 612 of the toner cartridge 6Y (see FIG. 14). The receiving portion 513 extends in the second direction. One end portion of the receiving portion 513 in the second direction is connected to the drum side plate 511A. The other end portion of the receiving portion 513 in the second direction is connected to the drum side plate 511B. The receiving portion 513 has a semi-cylindrical shape. The receiving portion 513 includes a toner receiving port 5131 and a plurality of holes 5132A, 5132B.

The toner receiving port 5131 is located at a central portion of the receiving portion 513 in the second direction. The toner receiving port 5131 communicates with the developing opening 133 of the developing housing 131Y (see FIG. 5).

The hole 5132A is located between the toner receiving port 5131 and the drum side plate 511A in the second direction. The hole 5132A is located away from the toner receiving port 5131 in the second direction.

The hole 5132B is located between the toner receiving port 5131 and the drum side plate 511B in the second direction. The hole 5132B is located on a side opposite to the hole 5132A with respect to the toner receiving port 5131 in the second direction. The hole 5132B is located away from the toner receiving port 5131 in the second direction.

2.1.4 Toner Shutter 514

Figure 4:
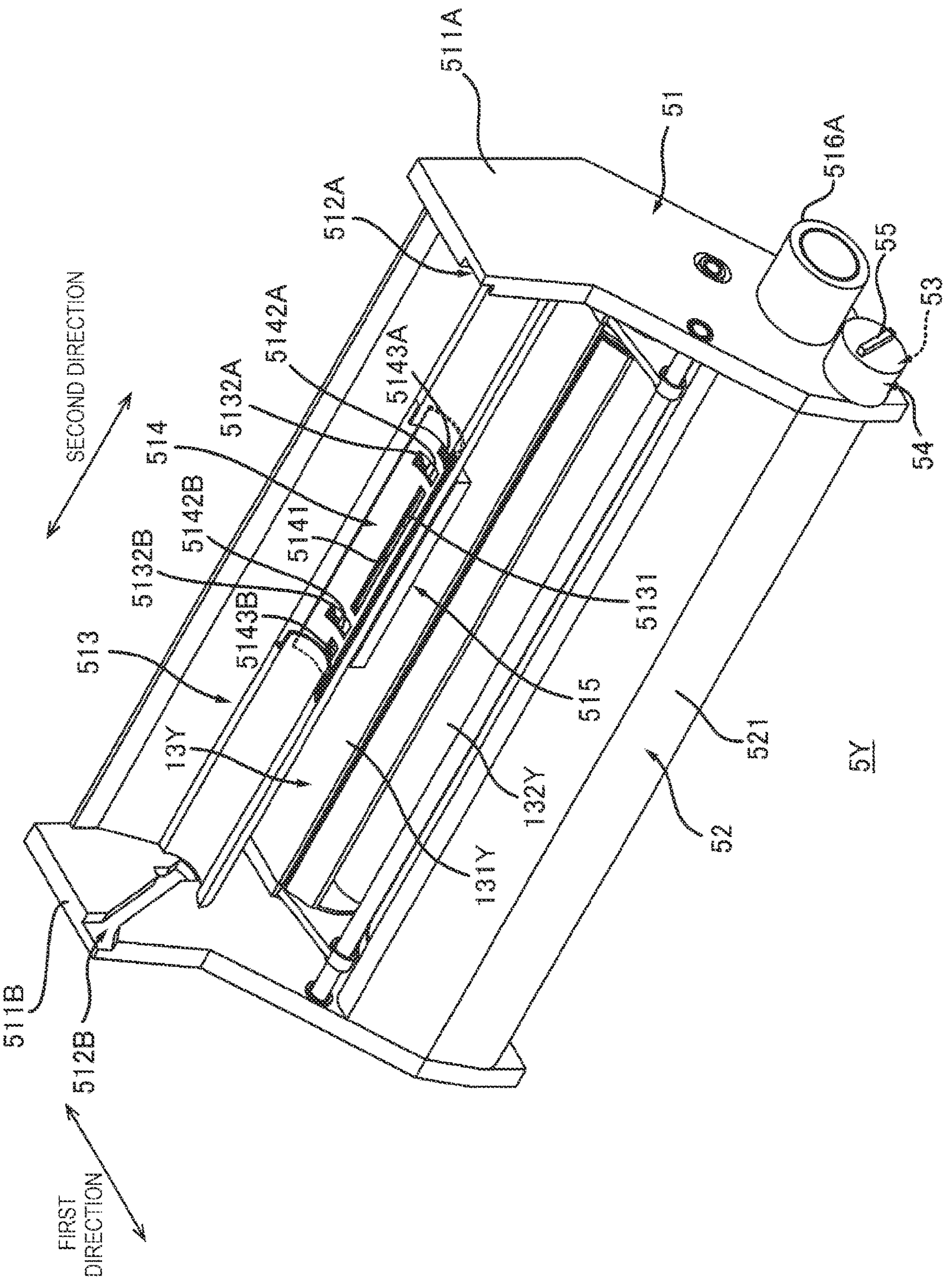
FIG. 4 is a perspective view of the drum cartridge shown in FIG. 3, showing a state where the toner shutter of the drum cartridge is located at an open position and the waste toner shutter of the drum cartridge is located at an open position.

The toner shutter 514 is attached to the receiving portion 513. The toner shutter 514 closes the toner receiving port 5131. The toner shutter 514 is movable between a closed position (see FIG. 3) and an open position (see FIG. 4). As shown in FIG. 3, in a state where the toner shutter 514 is located at the closed position, the toner shutter 514 closes the toner receiving port 5131. As shown in FIG. 4, in a state where the toner shutter 514 is located at the open position, the toner receiving port 5131 is opened. The toner shutter 514 has a toner shutter opening 5141, a plurality of through holes 5142A, 5142B, and a plurality of through holes 5143A, 5143B.

The toner shutter opening 5141 extends in the second direction. In the state where the toner shutter 514 is located at the open position, at least a part of the toner shutter opening 5141 communicates with the toner receiving port 5131. Accordingly, in the state where the toner shutter 514 is located at the open position, the toner receiving port 5131 is opened. On the other hand, as shown in FIG. 3, in the state where the toner shutter 514 is located at the closed position, the toner shutter opening 5141 is located away from the toner receiving port 5131.

The through hole 5142A is located between the toner shutter opening 5141 and the drum side plate 511A in the second direction. The through hole 5142A is located away from the toner shutter opening 5141 in the second direction. The through hole 5142A extends in a moving direction of the toner shutter 514. As shown in FIGS. 3 and 4, the through hole 5142A communicates with the hole 5132A both in the state where the toner shutter 514 is located at the closed position and in the state where the toner shutter 514 is located at the open position.

As shown in FIG. 3, the through hole 5142B is located between the toner shutter opening 5141 and the drum side plate 511B in the second direction. The through hole 5142B is located on a side opposite to the through hole 5142A with respect to the toner shutter opening 5141 in the second direction. The through hole 5142B is located away from the toner shutter opening 5141 in the second direction. The through hole 5142B extends in the moving direction of the toner shutter 514. As shown in FIGS. 3 and 4, the through hole 5142B communicates with the hole 5132B both in the state where the toner shutter 514 is located at the closed position and in the state where the toner shutter 514 is located at the open position.

As shown in FIG. 3, the through hole 5143A is located between the through hole 5142A, the drum side plate 511A in the second direction. The through hole 5143A is located on a side opposite to the toner shutter opening 5141 with respect to the through hole 5142A in the second direction.

The through hole 5143B is located between the through hole 5142B and the drum side plate 511B in the second direction. The through hole 5143B is located on a side opposite to the toner shutter opening 5141 with respect to the through hole 5142B in the second direction.

2.1.5 Seal Member 515

Figure 5:
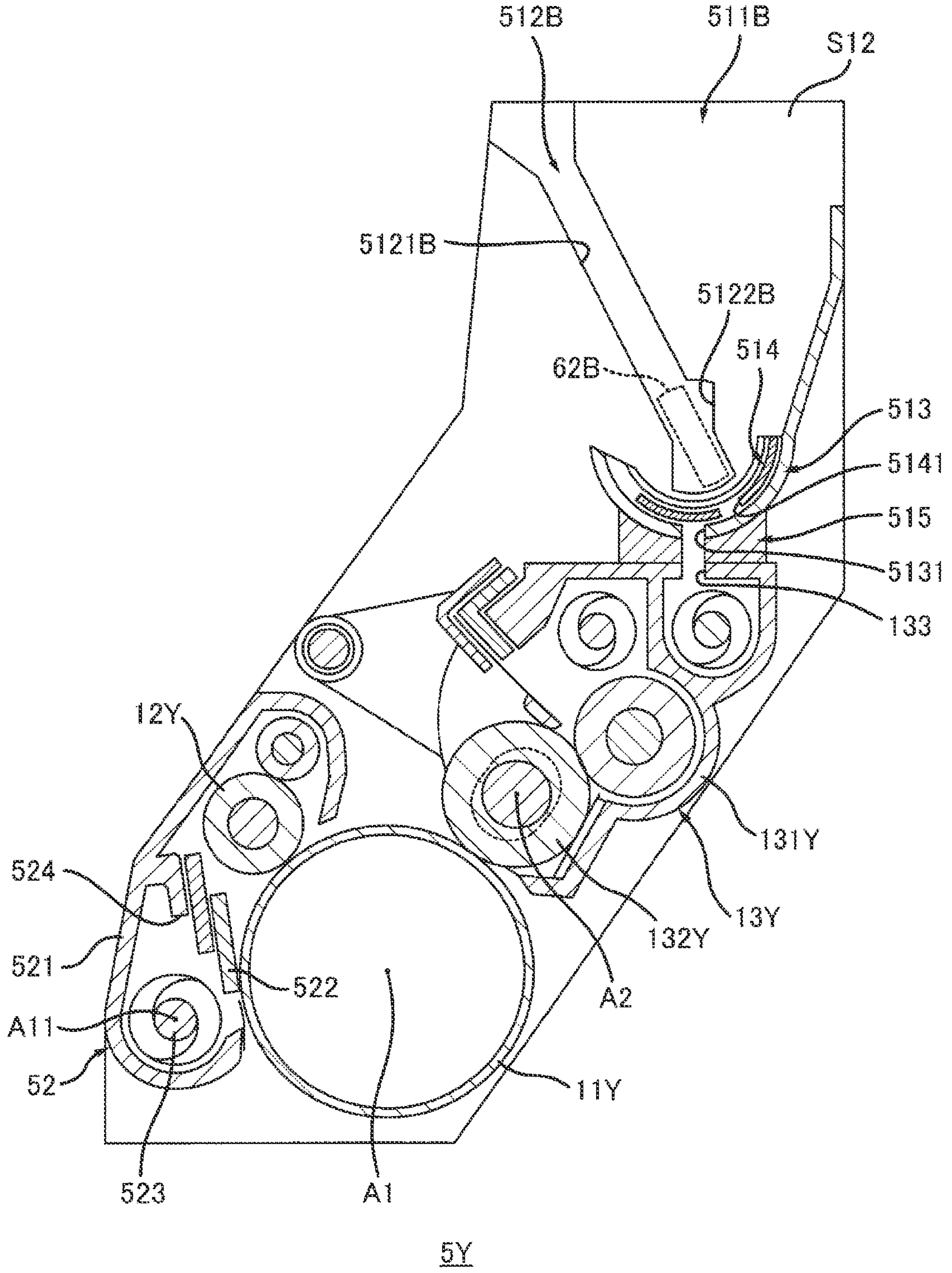
FIG. 5 is a cross-sectional view of the drum cartridge shown in FIG. 3, which is a cross-sectional view passing through a toner receiving port.

As shown in FIGS. 3 and 5, the seal member 515 is located between the receiving portion 513 and the developing housing 131Y. The seal member 515 seals between the receiving portion 513 and the developing housing 131Y. The seal member 515 surrounds the toner receiving port 5131 and the developing opening 133. The seal member 515 is made of, for example, sponge.

2.1.6 Cylindrical Portions 516A, 516B

As shown in FIG. 3, the cylindrical portion 516A is located on a side opposite to the drum side plate 511B with respect to the drum side plate 511A in the second direction. The cylindrical portion 516A is located on the outer surface S1 of the drum side plate 511A. The cylindrical portion 516A extends in the second direction. The cylindrical portion 516A extends from the outer surface S1 of the drum side plate 511A. The cylindrical portion 516A may be attached to the drum side plate 511A. The cylindrical portion 516A receives one end portion of the photosensitive drum 11Y in the second direction.

As shown in FIG. 8, the cylindrical portion 516B is located on a side opposite to the drum side plate 511A with respect to the drum side plate 511B in the second direction. The cylindrical portion 516B is located on the outer surface S11 of the drum side plate 511B. The cylindrical portion 516B extends in the second direction. The cylindrical portion 516B extends from the outer surface S11 of the drum side plate 511B. The cylindrical portion 516B may be attached to the drum side plate 511B. The cylindrical portion 516B receives the other end portion of the photosensitive drum 11Y in the second direction.

2.2 Drum Cleaner 52

As shown in FIG. 3, the drum cleaner 52 is located between the drum side plate 511A and the drum side plate 511B in the second direction. The drum cleaner 52 extends in the second direction. One end portion of the drum cleaner 52 in the second direction is connected to the drum side plate 511A. The other end portion of the drum cleaner 52 in the second direction is connected to the drum side plate 511B. The drum cleaner 52 collects waste toner. The waste toner is toner that remains on a surface of the photosensitive drum 11Y without being transferred to the intermediate transfer belt 81.

As shown in FIG. 5, the drum cleaner 52 includes a cleaning housing 521, a cleaning member 522 and a screw 523.

2.2.1 Cleaning Housing 521

As shown in FIG. 3, the cleaning housing 521 is located between the drum side plate 511A and the drum side plate 511B in the second direction. The cleaning housing 521 extends in the second direction. One end portion of the cleaning housing 521 in the second direction is connected to the drum side plate 511A. The other end portion of the cleaning housing 521 in the second direction is connected to the drum side plate 511B.

As shown in FIG. 5, the cleaning housing 521 has an opening 524. The cleaning housing 521 accommodates the waste toner.

2.2.2 Cleaning Member 522

The cleaning member 522 is attached to the cleaning housing 521. The cleaning member 522 extends in the second direction. The cleaning member 522 has a plate shape. The cleaning member 522 cleans the circumferential surface of the photosensitive drum 11Y. Specifically, an edge of the cleaning member 522 comes into contact with the surface of the photosensitive drum 11Y. When the photosensitive drum 11Y rotates, the waste toner on the surface of the photosensitive drum 11Y comes into contact with the edge of the cleaning member 522 and is removed from the surface of the photosensitive drum 11Y. In other words, the waste toner is removed from the circumferential surface of the photosensitive drum 11Y by the cleaning member 522. The removed waste toner is accommodated in the cleaning housing 521 through the opening 524.

2.2.3 Screw 523

The screw 523 is located in the cleaning housing 521. The screw 523 extends in the second direction. The screw 523 is rotatable about a first axis A11. The first axis A11 extends in the second direction. The screw 523 conveys the waste toner in the cleaning housing 521 toward the waste toner discharge portion 53 (see FIG. 3).

2.3 Waste Toner Discharge Portion 53

Figure 6:
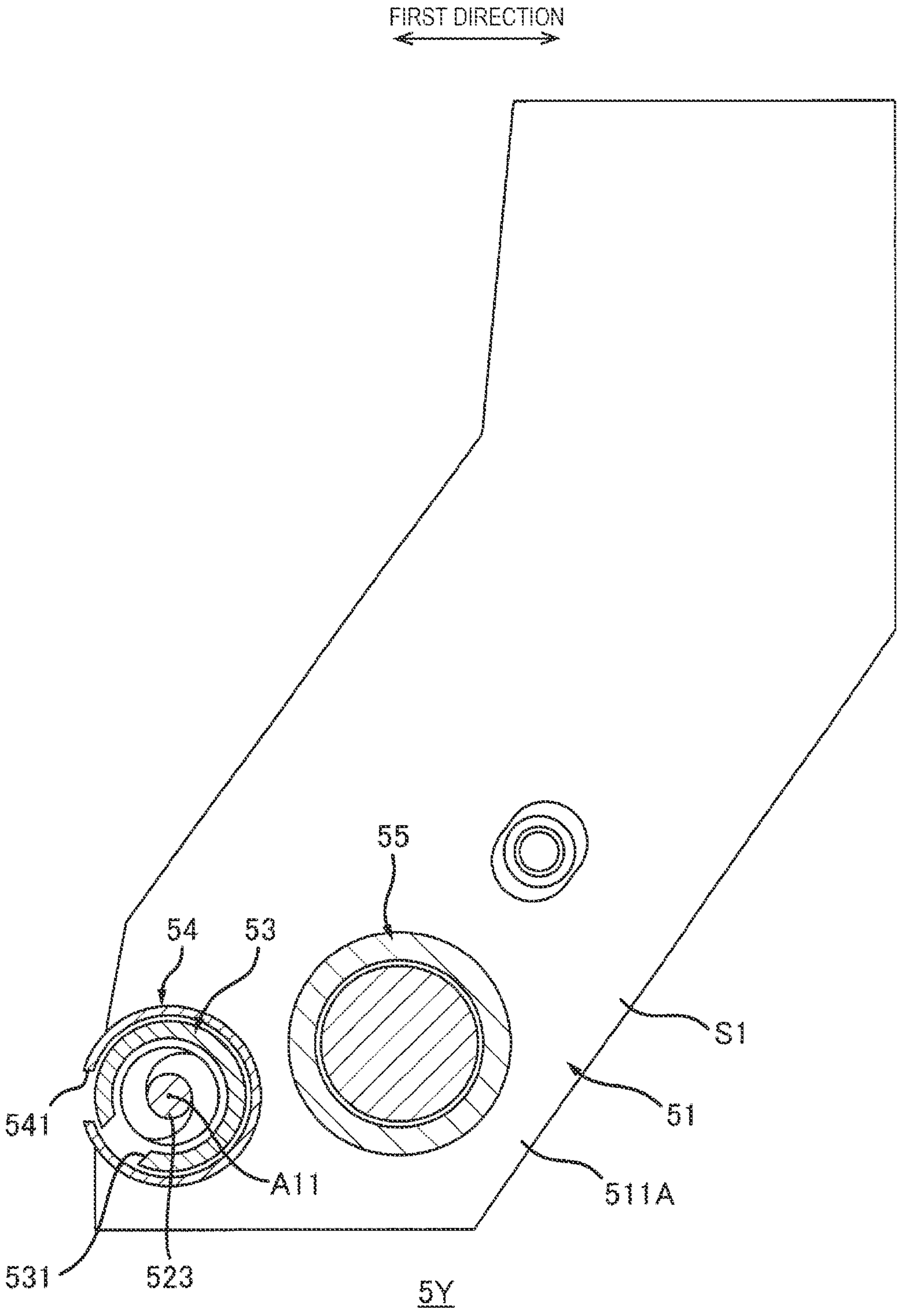
FIG. 6 is a cross-sectional view of the drum cartridge shown in FIG. 3, which is a cross-sectional view passing through a waste toner discharge port.

As shown in FIG. 3, the waste toner discharge portion 53 is located on the side opposite to the drum side plate 511B with respect to the drum side plate 511A in the second direction. The waste toner discharge portion 53 is located on the outer surface S1 of the drum side plate 511A. The waste toner discharge portion 53 extends in the second direction. The waste toner discharge portion 53 extends from the outer surface S1 of the drum side plate 511A. The waste toner discharge portion 53 may be attached to the outer surface S1 of the drum side plate 511A. The waste toner discharge portion 53 has a cylindrical shape. An internal space of the waste toner discharge portion 53 communicates with an internal space of the cleaning housing 521. As shown in FIG. 6, the waste toner discharge portion 53 has a waste toner discharge port 531. In other words, the drum frame 51 has the waste toner discharge port 531.

The waste toner discharge port 531 communicates with the internal space of the waste toner discharge portion 53. The waste toner discharge port 531 is capable of discharging the waste toner in the waste toner discharge portion 53.

2.4 Waste Toner Shutter 54

Figure 7:
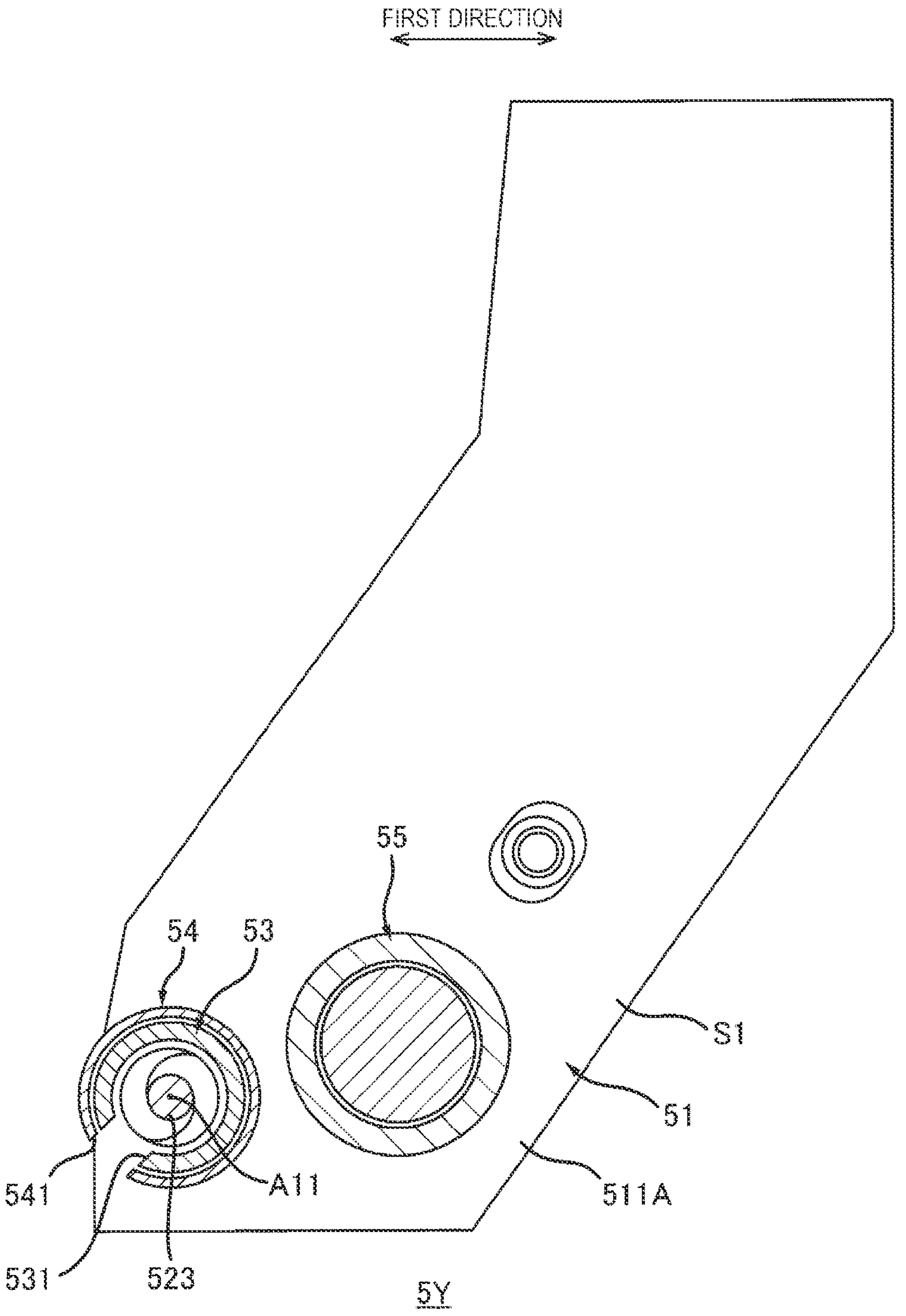
FIG. 7 is a cross-sectional view of the drum cartridge shown in FIG. 4, which is the cross-sectional view passing through the waste toner discharge port.

The waste toner shutter 54 is movable between a closed position (see FIG. 6) and an open position (see FIG. 7). The waste toner shutter 54 is rotatable about the first axis A11 between the closed position and the open position. As shown in FIG. 6, in a state where the waste toner shutter 54 is located at the closed position, the waste toner shutter 54 closes the waste toner discharge port 531. As shown in FIG. 7, in a state where the waste toner shutter 54 is located at the open position, the waste toner discharge port 531 is opened.

Specifically, as shown in FIG. 3, the waste toner shutter 54 is located on the side opposite to the drum side plate 511B with respect to the drum side plate 511A in the second direction. The waste toner shutter 54 is located on the outer surface S1 of the drum side plate 511A. The waste toner shutter 54 is attached to the waste toner discharge portion 53. The waste toner shutter 54 extends in the second direction. The waste toner shutter 54 has a cylindrical shape. The waste toner shutter 54 is rotatable with respect to the waste toner discharge portion 53. The waste toner shutter 54 is movable together with the engagement portion 55. The waste toner shutter 54 has a waste toner shutter opening 541.

As shown in FIG. 7, in the state where the waste toner shutter 54 is located at the open position, at least a part of the waste toner shutter opening 541 communicates with the waste toner discharge port 531. Accordingly, in the state where the waste toner shutter 54 is located at the open position, the waste toner discharge port 531 is opened. On the other hand, as shown in FIG. 6, in the state where the waste toner shutter 54 is located at the closed position, the waste toner shutter opening 541 is located away from the waste toner discharge port 531.

2.5 Engagement Portion 55

As shown in FIG. 3, the engagement portion 55 is located on a side opposite to the drum side plate 511A with respect to the waste toner shutter 54 in the second direction. The engagement portion 55 is located on a side surface of the waste toner shutter 54 in the second direction. In the state where the drum cartridge 5Y is mounted on the drawer 4, the engagement portion 55 is engaged with the lock member 42Y of the drawer 4 (see FIG. 9). The engagement portion 55 is rotatable about the first axis A11 together with the lock member 42Y by being engaged with the lock member 42Y.

Specifically, the engagement portion 55 is a protrusion. The engagement portion 55 protrudes in the second direction from the side surface of the waste toner shutter 54 in the second direction. The engagement portion 55 extends in a radial direction of the waste toner shutter 54. In the state where the drum cartridge 5Y is mounted on the drawer 4, the engagement portion 55 is fitted to a groove 421 of the lock member 42Y (see FIG. 9). The engagement portion 55 is rotatable about the first axis A11 together with the lock member 42Y by being fitted to the groove 421 of the lock member 42Y.

3. Details of Drawer 4

The drawer 4 will be described in detail with reference to FIGS. 8 to 13.

A "second direction" in the following description of the drawer 4 is the "second direction" "in the state where the drum cartridge 5Y is mounted on the drawer 4".

Figure 13A:
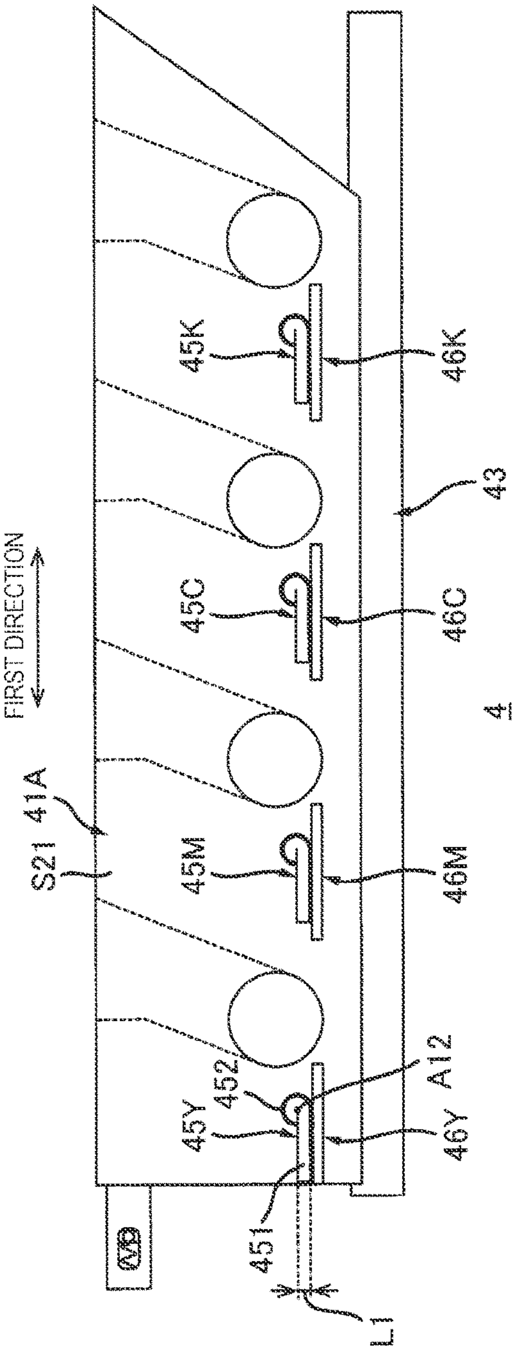
FIG. 13A is a side view of the drawer shown in FIG. 8, showing a state where an operation portion is located at a first position.

The drawer 4 includes a first side plate 41A (see FIG. 8), a second side plate 41B (see FIG. 8), a plurality of lock members 42Y, 42M, 42C, 42K (see FIG. 9), a waste toner conveying pipe 43 (see FIG. 9), a plurality of waste toner shutters 44Y, 44M, 44C, 44K (see FIG. 9), a plurality of operation portions 45Y, 45M, 45C, 45K (see FIG. 13A), and a plurality of stoppers 46Y, 46M, 46C, 46K (see FIG. 13A).

3.1 First Side Plate 41A and Second Side Plate 41B

As shown in FIG. 8, the first side plate 41A is located at one end portion of the drawer 4 in the second direction. In the state where the drum cartridge 5Y is mounted on the drawer 4, the first side plate 41A faces the drum side plate 511A in the second direction. In the state where the drum cartridge 5Y is mounted on the drawer 4, the first side plate 41A is located on a side opposite to the drum side plate 511B with respect to the drum side plate 511A in the second direction. The first side plate 41A has an outer surface S21 and an inner surface S22. The inner surface S22 is located between the outer surface S21 and the second side plate 41B in the second direction. The first side plate 41A supports the waste toner conveying pipe 43.

Figure 9:
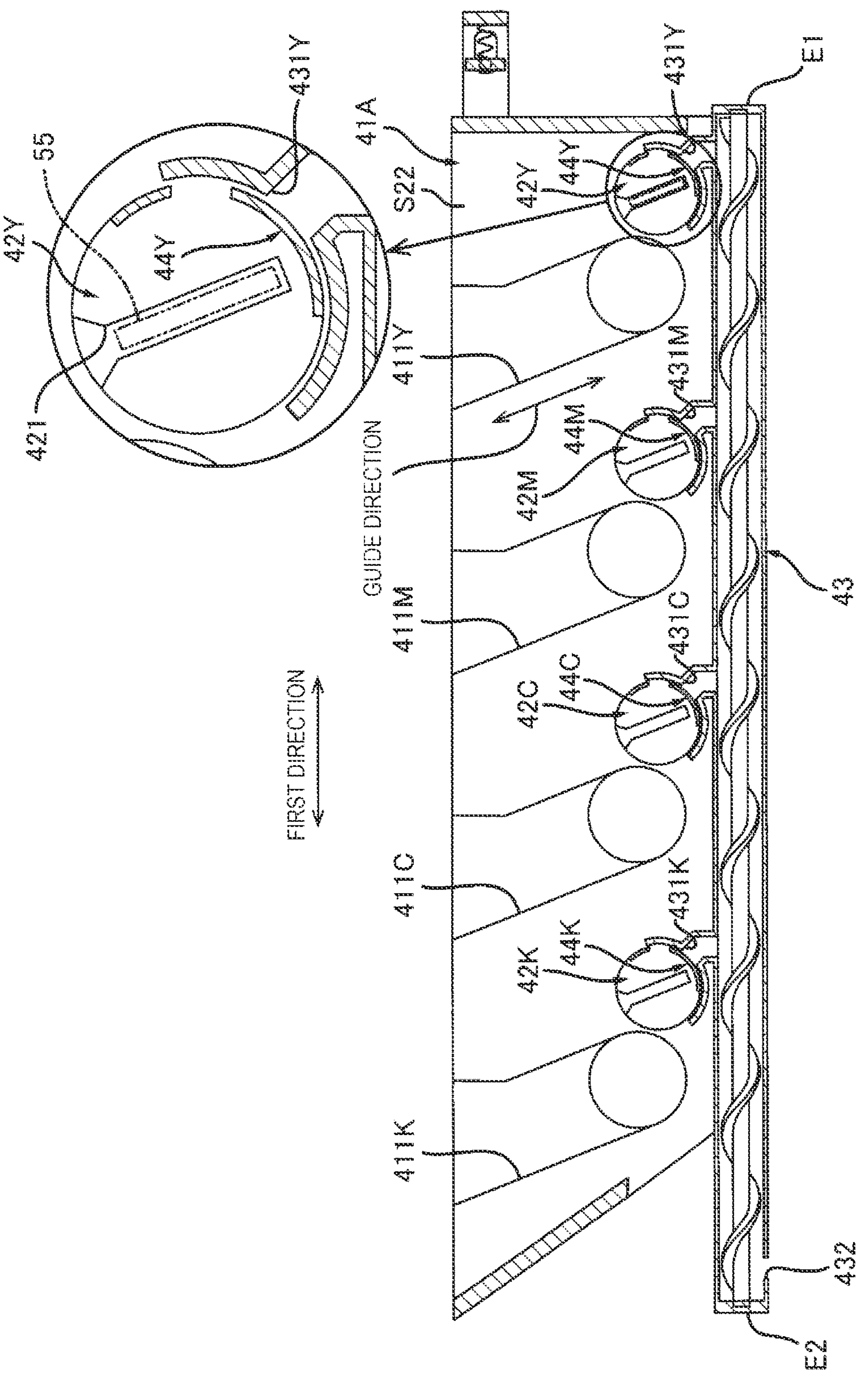
FIG. 9 is a cross-sectional view taken along a line B-B of the drawer shown in FIG. 8, showing a state where the waste toner shutter of the drawer is located at the closed position.

As shown in FIG. 9, the first side plate 41A includes a plurality of guides 411Y, 411M, 411C, 411K. In other words, the drawer 4 includes the plurality of guides 411Y, 411M, 411C, 411K. The plurality of guides 411Y, 411M, 411C, 411K are arranged in the first direction at intervals. The plurality of guides 411Y, 411M, 411C, 411K have the same shape. In the following description, the guide 411Y will be described, and description of the guides 411M, 411C, 411K will be omitted.

The guide 411Y guides mounting of the drum cartridge 5Y on the drawer 4. The guide 411Y is located on the inner surface S22 of the first side plate 41A. The guide 411Y extends in a guide direction. The guide direction intersects with the first direction and the second direction. Specifically, the guide direction intersects with the first direction and is orthogonal to the second direction. The guide 411Y is a recess. The guide 411Y may be a rib. In the state where the drum cartridge 5Y is mounted on the drawer 4, the cylindrical portion 516A of the drum cartridge 5Y (see FIG. 8) is fitted to the guide 411Y.

As shown in FIG. 8, the second side plate 41B is located at the other end portion of the drawer 4 in the second direction. The second side plate 41B is located away from the first side plate 41A in the second direction. In the state where the drum cartridge 5Y is mounted on the drawer 4, the second side plate 41B faces the drum side plate 511B in the second direction. In the state where the drum cartridge 5Y is mounted on the drawer 4, the second side plate 41B is located on a side opposite to the drum side plate 511A with respect to the drum side plate 511B in the second direction. The second side plate 41B has an outer surface S31 and an inner surface S32. The inner surface S32 is located between the outer surface S31 and the first side plate 41A in the second direction.

The second side plate 41B includes a plurality of guides 412Y, 412M, 412C, 412K. The guides 412M, 412C, 412K are not shown. The plurality of guides 412Y, 412M, 412C, 412K are arranged in the first direction at intervals. The plurality of guides 412Y, 412M, 412C, 412K have the same shape. In the following description, the guide 412Y will be described, and description of the guides 412M, 412C, 412K will be omitted.

The guide 412Y guides the mounting of the drum cartridge 5Y on the drawer 4 together with the guide 411Y. The guide 412Y is located on the inner surface S32 of the second side plate 41B. The guide 412Y extends in the guide direction. The guide 412Y is a recess. The guide 412Y may be a rib. In the state where the drum cartridge 5Y is mounted on the drawer 4, the cylindrical portion 516B of the drum cartridge 5Y is fitted to the guide 412Y.

3.2 Plurality of Lock Members 42Y, 42M, 42C, 42K

As shown in FIG. 9, the plurality of lock members 42Y, 42M, 42C, 42K are located on the inner surface S22 of the first side plate 41A. That is, the plurality of lock members 42Y, 42M, 42C, 42K are located between the first side plate 41A and the second side plate 41B in the second direction. The lock member 42Y is located on a side opposite to the guide 411M with respect to the guide 411Y in the first direction. The lock member 42M is located between the guide 411Y and the guide 411M in the first direction. The lock member 42C is located between the guide 411M and the guide 411C in the first direction. The lock member 42K is located between the guide 411C and the guide 411K in the first direction.

Figure 10:
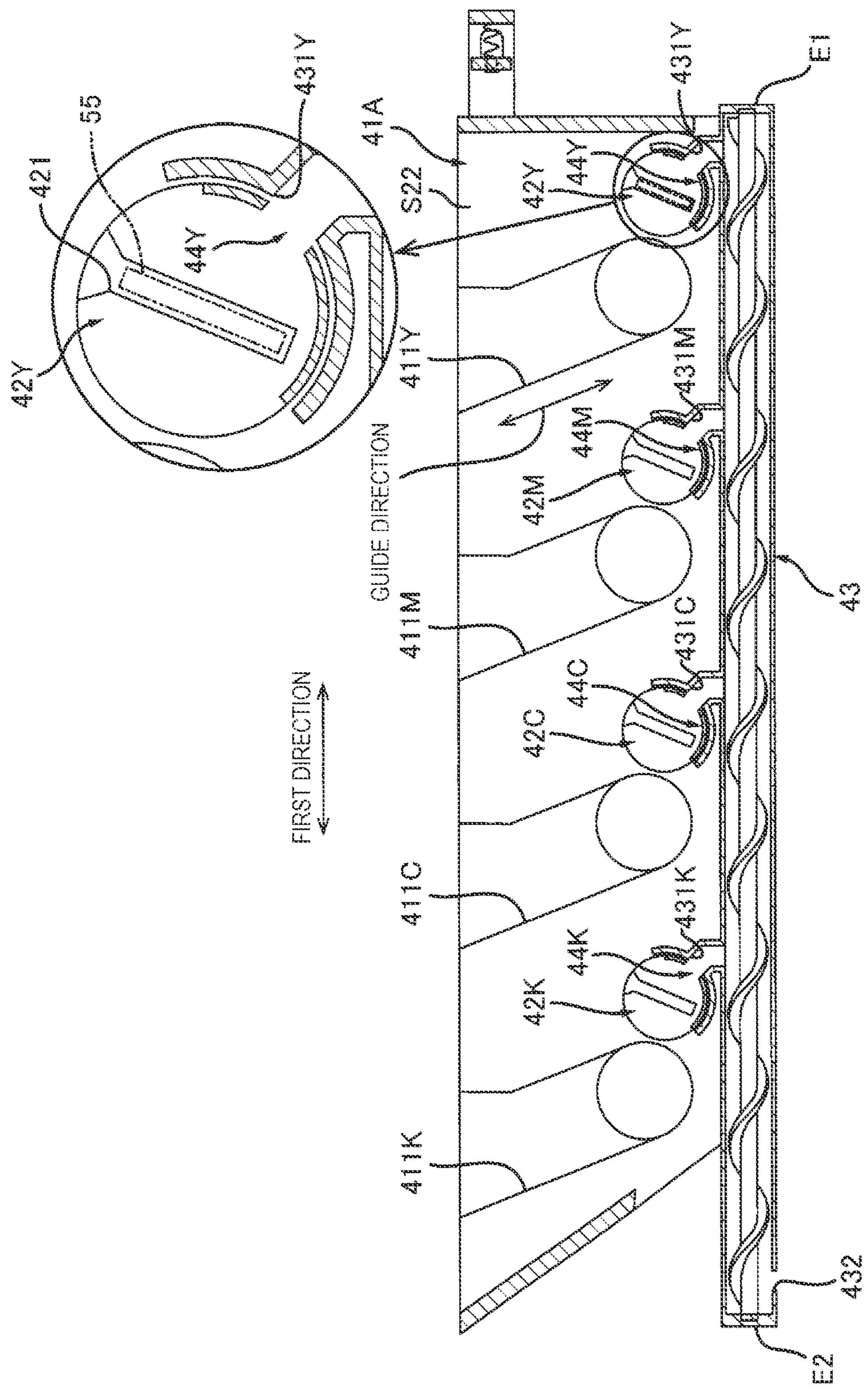
FIG. 10 shows the drawer shown in FIG. 9 in a state where the waste toner shutter of the drawer is located at the open position.

The lock member 42Y is movable between a lock position (see FIG. 10) and an unlock position (see FIG. 9). In the state where the drum cartridge 5Y is mounted on the drawer 4, the lock member 42Y is rotatable about the first axis A11 (see FIG. 3) between the lock position and the unlock position. In the state where the drum cartridge 5Y is mounted on the drawer 4, as shown in FIG. 10, when the lock member 42Y is located at the lock position, the lock member 42Y locks the drum cartridge 5Y to the drawer 4. "Locking the drum cartridge 5Y to the drawer 4" means that the drum cartridge 5Y is not detachable from the drawer 4. In the state where the drum cartridge 5Y is mounted on the drawer 4, as shown in FIG. 9, when the lock member 42Y is located at the unlock position, the drum cartridge 5Y is unlocked from the drawer 4.

Specifically, the lock member 42Y has a disk shape. In the state where the drum cartridge 5Y is mounted on the drawer 4, the lock member 42Y faces a side surface of the waste toner shutter 54 of the drum cartridge 5Y (see FIG. 3) in the second direction. The lock member 42Y has the groove 421. The groove 421 extends in a radial direction of the lock member 42Y. In the state where the drum cartridge 5Y is mounted on the drawer 4, the engagement portion 55 of the drum cartridge 5Y (see FIG. 3) is fitted to the groove 421.

In a state where the lock member 42Y is located at the unlock position, the groove 421 extends in the guide direction. Therefore, in a state where the drum cartridge 5Y is mounted on the drawer 4 and the lock member 42Y is located at the unlock position, in a case where the drum cartridge 5Y moves in the guide direction, the engagement portion 55 comes out of the groove 421. Accordingly, in the state where the drum cartridge 5Y is mounted on the drawer 4 and the lock member 42Y is located at the unlock position, the drum cartridge 5Y is detachable from the drawer 4. That is, in the state where the drum cartridge 5Y is mounted on the drawer 4, in a case where the lock member 42Y is located at the unlock position, the lock member 42Y unlocks the drum cartridge 5Y from the drawer 4.

On the other hand, as shown in FIG. 10, in a state where the lock member 42Y is located at the lock position, the groove 421 extends in a direction intersecting with the guide direction. Therefore, in a state where the drum cartridge 5Y is mounted on the drawer 4 and the lock member 42Y is located at the lock position, in the case where the drum cartridge 5Y moves in the guide direction, the engagement portion 55 does not come out of the groove 421. Accordingly, in the state where the drum cartridge 5Y is mounted on the drawer 4 and the lock member 42Y is located at the lock position, the drum cartridge 5Y is not detachable from the drawer 4. That is, in the state where the drum cartridge 5Y is mounted on the drawer 4, in the case where the lock member 42Y is located at the lock position, the lock member 42Y locks the drum cartridge 5Y to the drawer 4

The lock members 42M, 42C, 42K can be described in the same manner as the lock member 42Y. Therefore, description of the lock members 42M, 42C, 42K will be omitted.

3.3 Waste Toner Conveying Pipe 43

Figure 11:
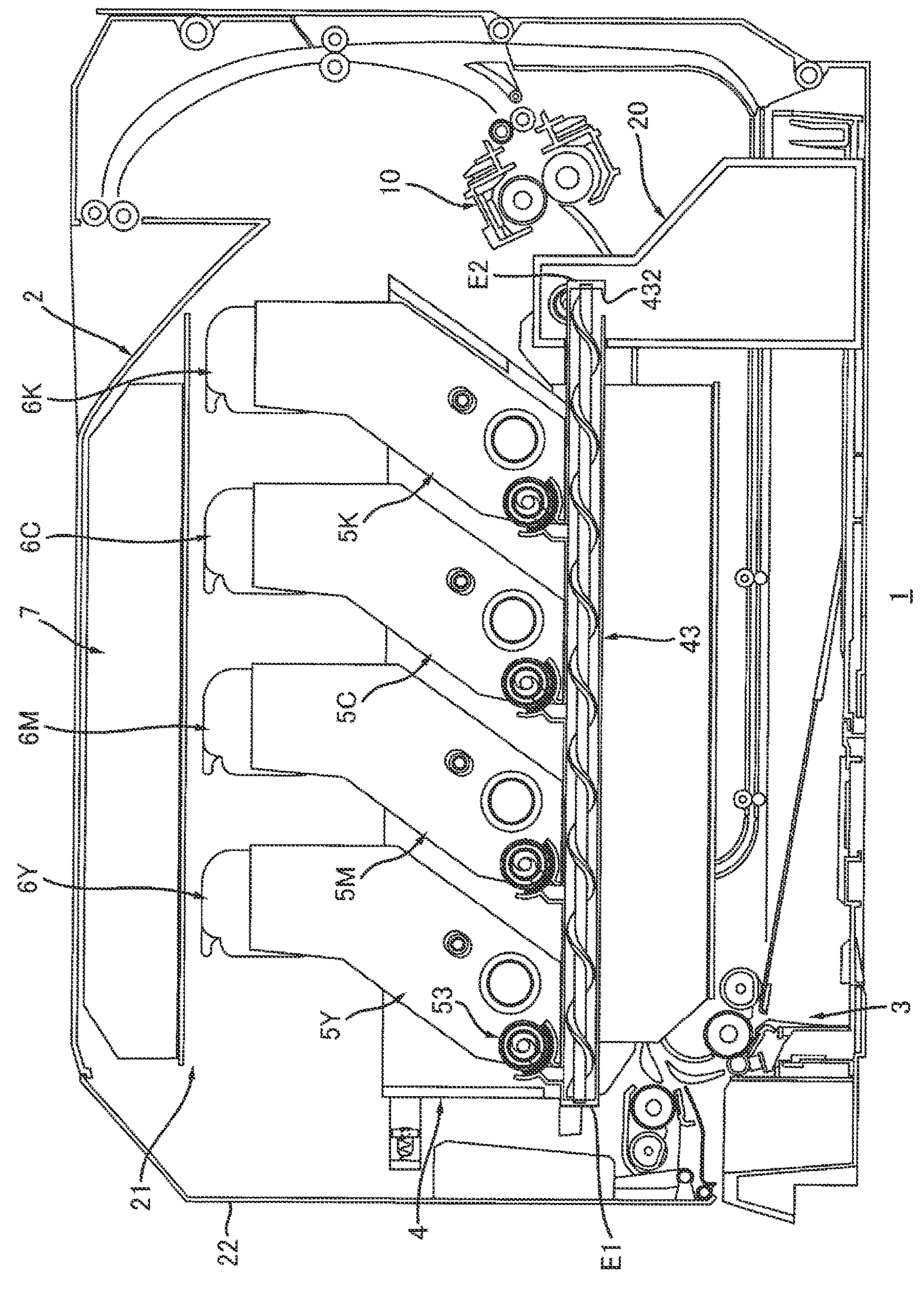
FIG. 11 shows a state where the drawer is located at an accommodated position and a waste toner conveying pipe and a waste toner accommodating portion are connected to each other.

As shown in FIG. 8, the waste toner conveying pipe 43 is located between the first side plate 41A and the second side plate 41B in the second direction. As shown in FIG. 9, the waste toner conveying pipe 43 extends in the first direction. The waste toner conveying pipe 43 allows passage of the waste toner therethrough. The waste toner conveying pipe 43 includes one end portion E1 in the first direction and the other end portion E2 in the first direction. As shown in FIG. 11, in the state where the drawer 4 is located at the accommodated position, the other end portion E2 of the waste toner conveying pipe 43 is connected to a waste toner accommodating portion 20. On the other hand, as shown in FIG. 11, in the state where the drawer 4 is located at the drawn-out position, the other end portion E2 of the waste toner conveying pipe 43 is separated from the waste toner accommodating portion 20.

The image forming apparatus 1 includes the waste toner accommodating portion 20. The waste toner accommodating portion 20 is located in the main body housing 2. The waste toner accommodating portion 20 accommodates the waste toner.

As shown in FIG. 9, the waste toner conveying pipe 43 includes a plurality of waste toner receiving ports 431Y, 431M, 431C, 431K and a waste toner discharge port 432.

The plurality of waste toner receiving ports 431Y, 431M, 431C, 431K are located between one end portion E1 of the waste toner conveying pipe 43 and the other end portion E2 of the waste toner conveying pipe 43 in the first direction. The waste toner receiving port 431Y is capable of receiving the waste toner from the drum cartridge 5Y mounted on the drawer 4 (see FIG. 1). The waste toner receiving port 431M is capable of receiving the waste toner from the drum cartridge 5M mounted on the drawer 4 (see FIG. 1). The waste toner receiving port 431C is capable of receiving the waste toner from the drum cartridge 5C mounted on the drawer 4 (see FIG. 1). The waste toner receiving port 431K is capable of receiving the waste toner from the drum cartridge 5K mounted on the drawer 4 (see FIG. 1).

The waste toner discharge port 432 is capable of discharging the waste toner in the waste toner conveying pipe 43. The waste toner discharge port 432 is located at the other end portion E2 of the waste toner conveying pipe 43. As shown in FIG. 11, in a state where the waste toner conveying pipe 43 is connected to the waste toner accommodating portion 20, the waste toner discharge port 432 is located in the waste toner accommodating portion 20.

3.4 Plurality of Waste Toner Shutters 44Y, 44M, 44C, 44K

As shown in FIGS. 9 and 10, the waste toner shutter 44Y is movable between a closed position (see FIG. 9) and an open position (see FIG. 10). As shown in FIG. 9, in a state where the waste toner shutter 44Y is located at the closed position, the waste toner shutter 44Y closes the waste toner receiving port 431Y. As shown in FIG. 10, in a state where the waste toner shutter 44Y is located at the open position, the waste toner receiving port 431Y is opened.

Specifically, the waste toner shutter 44Y has an arc shape. In the state where the drum cartridge 5Y is mounted on the drawer 4, the waste toner shutter 44Y extends along a circumferential surface of the waste toner shutter 54 of the drum cartridge 5Y (see FIG. 3).

The waste toner shutter 44Y is located on a side opposite to the first side plate 41A with respect to the lock member 42Y in the second direction. The waste toner shutter 44Y is located between the first side plate 41A and the second side plate 41B (see FIG. 8) in the second direction. The waste toner shutter 44Y extends in the second direction. The waste toner shutter 44Y extends from the lock member 42Y. The waste toner shutter 44Y may be attached to the lock member 42Y. The waste toner shutter 44Y is movable together with the lock member 42Y.

The waste toner shutter 44Y moves from the closed position to the open position as the lock member 42Y moves from the unlock position (see FIG. 9) to the lock position (see FIG. 10). In a state where the drum cartridge 5Y is mounted on the drawer 4 and the engagement portion 55 (see FIG. 3) is engaged with the lock member 42Y, the waste toner shutter 44Y moves from the closed position to the open position as the lock member 42Y moves from the unlock position to the lock position.

The waste toner shutter 44Y moves from the open position to the closed position as the lock member 42Y moves from the lock position (see FIG. 10) to the unlock position (see FIG. 9). In the state where the drum cartridge 5Y is mounted on the drawer 4 and the engagement portion 55 is engaged with the lock member 42Y, the waste toner shutter 44Y moves from the open position to the closed position as the lock member 42Y moves from the lock position to the unlock position.

The waste toner shutters 44M, 44C, 44K can be described in the same manner as the waste toner shutter 44Y. Therefore, description of the waste toner shutters 44M, 44C, 44K will be omitted.

3.5 Plurality of Operation Portions 45Y, 45M, 45C, 45K

As shown in FIG. 13A, the operation portions 45Y, 45M, 45C, 45K are located on the outer surface S21 of the first side plate 41A. The operation portions 45Y, 45M, 45C, 45K are located on a side opposite to the second side plate 41B with respect to the first side plate 41A (see FIG. 8) in the second direction.

Figure 13B:
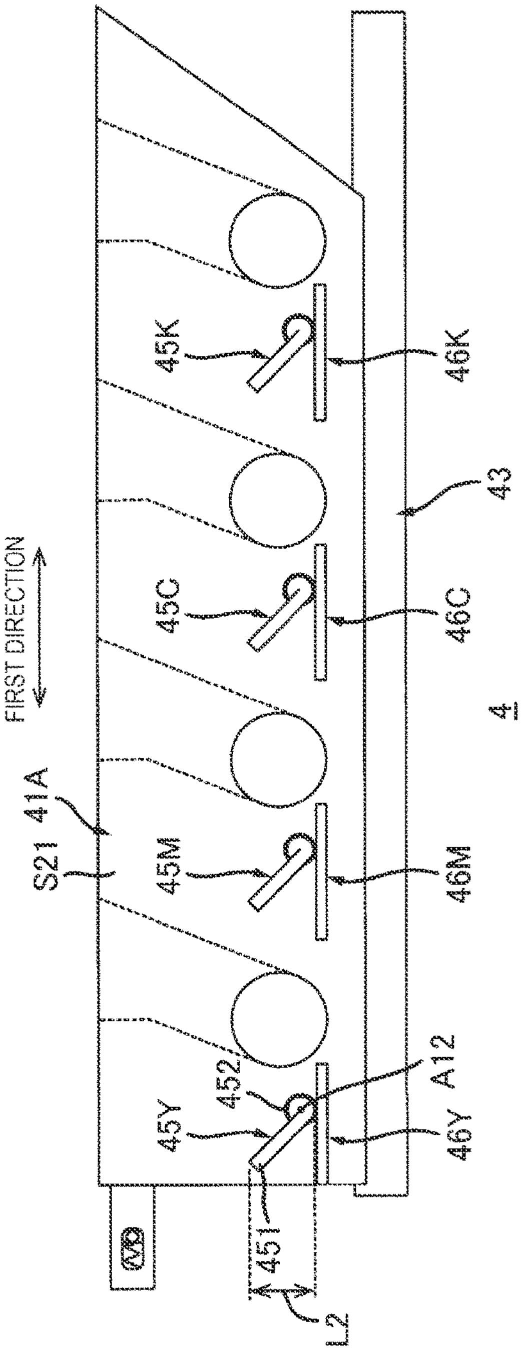
FIG. 13B shows a state where the operation portion shown in FIG. 13A is located at a second position.

The operation portion 45Y is operated by an operator to move the lock member 42Y. Specifically, the operation portion 45Y is operated by the operator to move the lock member 42Y (see FIG. 9) between the lock position and the unlock position. The operation portion 45Y is movable between a first position (see FIG. 13A) and a second position (see FIG. 13B). The operation portion 45Y is rotatable about a second axis A12 between the first position and the second position. As shown in FIG. 13A, in a state where the operation portion 45Y is located at the first position, the operation portion 45Y causes the lock member 42Y (see FIG. 10) to be located at the lock position. As shown in FIG. 13B, in a state where the operation portion 45Y is located at the second position, the operation portion 45Y causes the lock member 42Y (see FIG. 9) to be located at the unlock position.

Specifically, as shown in FIG. 13A, the operation portion 45Y includes a lever 451 and a shaft 452.

The lever 451 is rotatable about the second axis A12. In the state where the operation portion 45Y is located at the first position, the lever 451 extends in the first direction. In other words, in the state where the operation portion 45Y is located at the first position, the lever 451 extends in a moving direction of the drawer 4. On the other hand, as shown in FIG. 13B, in the state where the operation portion 45Y is located at the second position, the lever 451 extends in a direction intersecting with the first direction. In other words, in the state where the operation portion 45Y is located at the second position, the lever 451 extends in the direction intersecting with the moving direction of the drawer 4.

As shown in FIG. 13A, the shaft 452 is located at one end portion of the lever 451. The shaft 452 extends in the second direction. The shaft 452 extends along the second axis A12. The shaft 452 extends from one end portion of the lever 451. The shaft 452 penetrates the first side plate 41A. The shaft 452 is connected to the lock member 42Y (see FIG. 10).

As shown in FIG. 8, the main body housing 2 has a receiving groove 23.

When the drawer 4 moves between the accommodated position and the drawn-out position, the receiving groove 23 receives the lever 451. The receiving groove 23 extends in the first direction. In other words, the receiving groove 23 extends in the moving direction of the drawer 4. In the state where the operation portion 45Y is located at the first position, a width W of the receiving groove 23 is longer than a length L1 of the lever 451 in a width direction of the receiving groove 23 (see FIG. 13A).

On the other hand, in the state where the operation portion 45Y is located at the second position, a length L2 of the lever 451 in the width direction (see FIG. 13B) is longer than the width W of the receiving groove 23. Therefore, in the state where the operation portion 45Y is located at the second position, when the drawer 4 located at the drawn-out position moves toward the accommodated position, the lever 451 comes into contact with an inner surface 231 of the receiving groove 23. In a state where the lever 451 is in contact with the inner surface 231 of the receiving groove 23, when the drawer 4 further moves toward the accommodated position, the lever 451 is pushed by the inner surface 231 of the receiving groove 23 and the operation portion 45Y rotates from the second position to the first position. That is, when the drawer 4 located at the drawn-out position moves toward the accommodated position, the inner surface 231 of the receiving groove 23 comes into contact with the lever 451 of the operation portion 45Y located at the second position to move the operation portion 45Y located at the second position to the first position. The inner surface 231 of the receiving groove 23 is a contact portion that comes into contact with the lever 451. The main body housing 2 includes the contact portion.

The operation portions 45M, 45C, 45K can be described in the same manner as the operation portion 45Y. Therefore, description of the operation portions 45M, 45C, 45K will be omitted.

3.6 Plurality of Stoppers 46Y, 46M, 46C, 46K

As shown in FIG. 13A, the stoppers 46Y, 46M, 46C, 46K are located on the outer surface S21 of the first side plate 41A. The stoppers 46Y, 46M, 46C, 46K are located on the side opposite to the second side plate 41B with respect to the first side plate 41A (see FIG. 8) in the second direction.

The stopper 46Y stops the operation portion 45Y, which moves from the second position to the first position, at the first position. As shown in FIG. 8, the stopper 46Y protrudes from the outer surface S21 of the first side plate 41A. The stopper 46Y may be attached to the outer surface S21 of the first side plate 41A. The stopper 46Y extends in the first direction. The stopper 46Y is a rib. The stopper 46Y comes into contact with the operation portion 45Y that has moved from the second position to the first position.

The stoppers 46M, 46C, 46K can be described in the same manner as the stopper 46Y. Therefore, description of the stoppers 46M, 46C, 46K will be omitted.

4. Details of Toner Cartridge 6Y

The toner cartridge 6Y will be described in detail with reference to FIGS. 14 to 18.

Each of the toner cartridges 6M, 6C, 6K has a structure the same as that of the toner cartridge 6Y. Therefore, description of the toner cartridges 6M, 6C, 6K will be omitted.

A "second direction" in the following description of the toner cartridge 6Y is the "second direction" "in the state where the toner cartridge 6Y is mounted on the drum cartridge 5Y".

As shown in FIG. 14, the toner cartridge 6Y extends in the second direction. The toner cartridge 6Y includes a toner housing 61, a plurality of protrusions 62A, 62B, a plurality of protrusions 63A, 63B, a toner shutter 64, and a plurality of protrusions 65A, 65B.

4.1 Toner Housing 61

Figure 15:
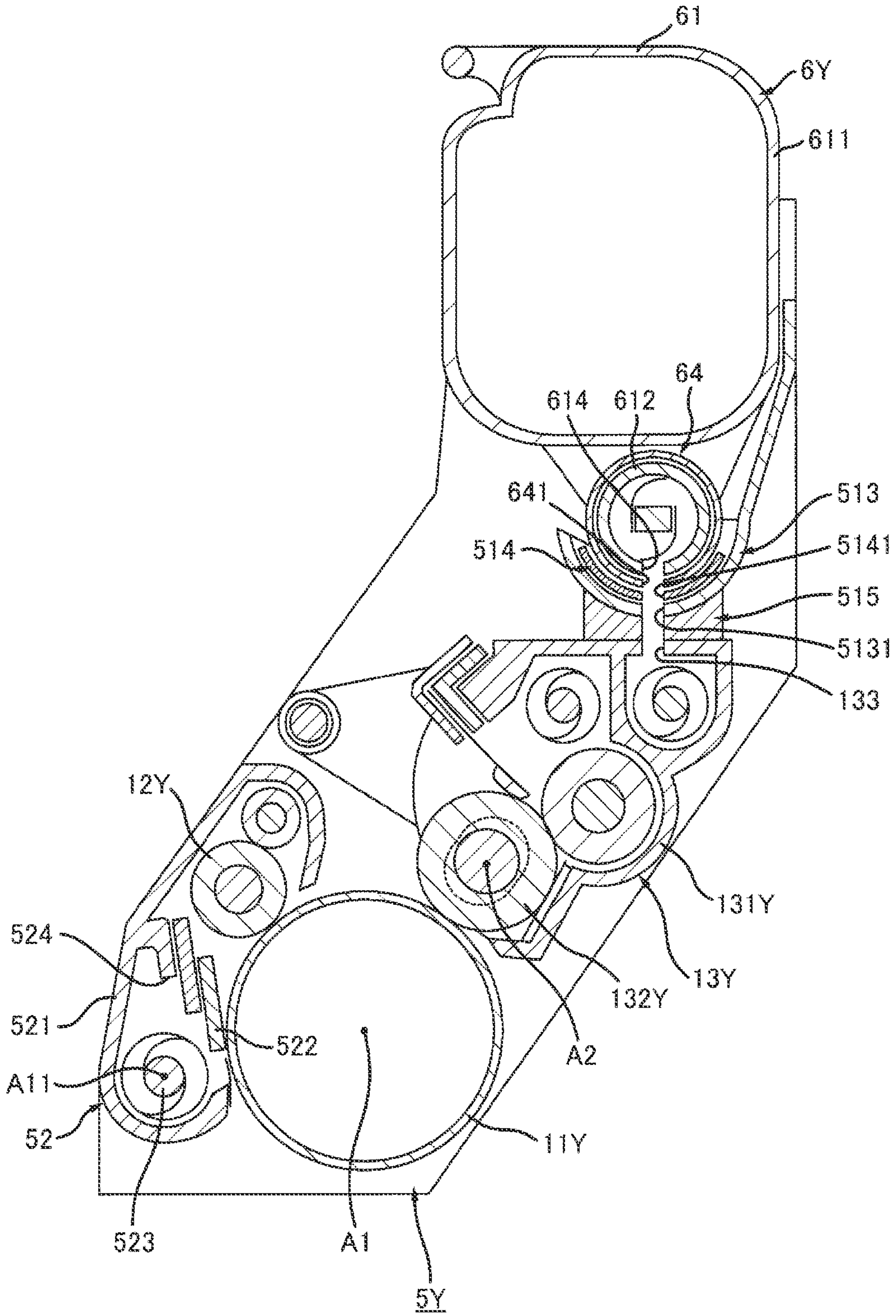
FIG. 15 shows a state where the toner cartridge is mounted on the drum cartridge and a toner housing is located at a toner lock position.
Figure 16:
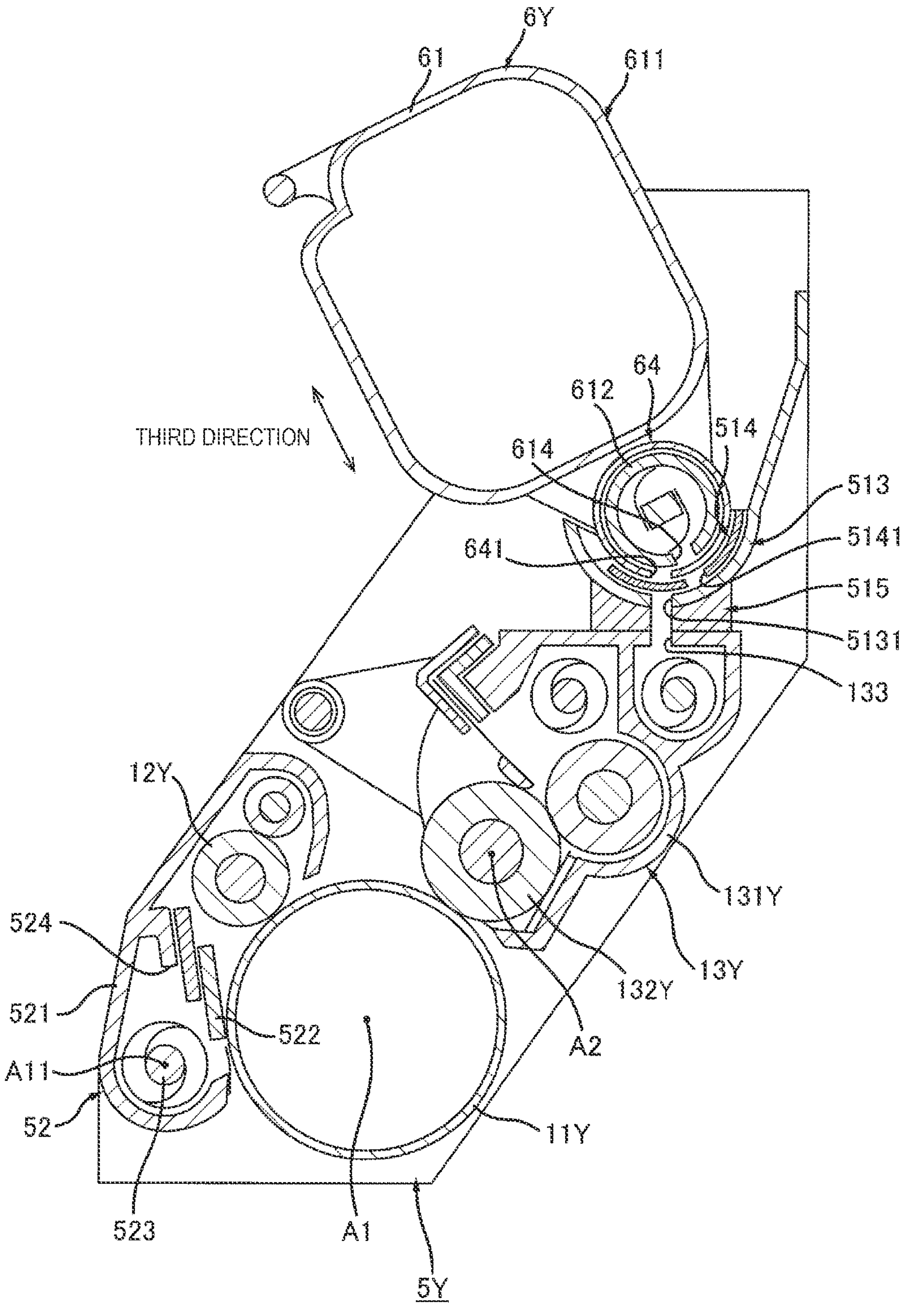
FIG. 16 shows a state where the toner cartridge is mounted on the drum cartridge and the toner housing is located at a toner unlock position.

In the state where the toner cartridge 6Y is mounted on the drum cartridge 5Y, the toner housing 61 is rotatable between a toner lock position (see FIG. 15) and a toner unlock position (see FIG. 16). As shown in FIG. 15, in a state where the toner housing 61 is located at the toner lock position, the protrusion 62A is fitted to the lock portion 5122A of the drum cartridge 5Y (see FIG. 3), and the protrusion 62B is fitted to the lock portion 5122B of the drum cartridge 5Y (see FIG. 3). Accordingly, in the state where the toner housing 61 is located at the toner lock position, the toner cartridge 6Y is locked to the drum cartridge 5Y. "Locking the toner cartridge 6Y to the drum cartridge 5Y" means that the toner cartridge 6Y is not detachable from the drum cartridge 5Y. As shown in FIG. 16, in a state where the toner housing 61 is located at the toner unlock position, the protrusion 62A is disengaged from the lock portion 5122A of the drum cartridge 5Y (see FIG. 3), and the protrusion 62B is disengaged from the lock portion 5122B of the drum cartridge 5Y (see FIG. 3). Accordingly, in the state where the toner housing 61 is located at the toner unlock position, the toner cartridge 6Y is unlocked from the drum cartridge 5Y.

As shown in FIG. 14, the toner housing 61 extends in the second direction. The toner housing 61 includes a first accommodating portion 611, the second accommodating portion 612, and a plurality of connecting portions 613A, 613B.

4.1.1 First Accommodating Portion 611

The first accommodating portion 611 extends in the second direction. The first accommodating portion 611 has a tubular shape. The first accommodating portion 611 is capable of accommodating the toner. In other words, the toner housing 61 is capable of accommodating the toner.

4.1.2 Second Accommodating Portion 612

The second accommodating portion 612 is located away from the first accommodating portion 611 in a fourth direction. The fourth direction intersects with the second direction. Preferably, the fourth direction is orthogonal to the second direction. The second accommodating portion 612 extends in the second direction. The second accommodating portion 612 has a cylindrical shape. A volume of the second accommodating portion 612 is smaller than a volume of the first accommodating portion 611. The second accommodating portion 612 has a toner discharge port 614. In other words, the toner housing 61 has the toner discharge port 614.

The toner discharge port 614 is located between the protrusion 63A and the protrusion 63B in the second direction. The toner discharge port 614 is located at a center of the second accommodating portion 612 in the second direction. The toner discharge port 614 extends in the second direction. The toner discharge port 614 is capable of discharging the toner in the toner housing 61.

4.1.3 Connecting Portions 613A, 613B

The connecting portion 613A is located between one end portion of the first accommodating portion 611 in the second direction and one end portion of the second accommodating portion 612 in the second direction. The connecting portion 613A connects one end portion of the first accommodating portion 611 in the second direction and one end portion of the second accommodating portion 612 in the second direction.

The connecting portion 613B is located between the other end portion of the first accommodating portion 611 in the second direction and the other end portion of the second accommodating portion 612 in the second direction. The connecting portion 613B is located to be spaced apart from the connecting portion 613A in the second direction. The connecting portion 613B connects the other end portion of the first accommodating portion 611 in the second direction and the other end portion of the second accommodating portion 612 in the second direction.

The second accommodating portion 612 communicates with the first accommodating portion 611 via the connecting portion 613A and the connecting portion 613B. The toner in the first accommodating portion 611 enters the second accommodating portion 612 through the connecting portion 613A and the connecting portion 613B.

4.2 Protrusions 62A, 62B

The protrusion 62A is located at one end portion of the toner cartridge 6Y in the second direction. The protrusion 62A is located at one end portion of the second accommodating portion 612 in the second direction. The protrusion 62A protrudes in the second direction from one end portion of the second accommodating portion 612 in the second direction. The protrusion 62A extends in a radial direction of the second accommodating portion 612. The protrusion 62A extends in the fourth direction.

The protrusion 62B is located at the other end portion of the toner cartridge 6Y in the second direction. The protrusion 62B is located at the other end portion of the second accommodating portion 612 in the second direction. The protrusion 62B protrudes in the second direction from the other end portion of the second accommodating portion 612 in the second direction. The protrusion 62B extends in the radial direction of the second accommodating portion 612. The protrusion 62B extends in the fourth direction.

4.3 Protrusions 63A, 63B

The protrusion 63A is located between the toner discharge port 614 and the protrusion 62A in the second direction. The protrusion 63A is located between the toner shutter 64 and the protrusion 62A in the second direction. The protrusion 63A is located on a side opposite to the first accommodating portion 611 with respect to the second accommodating portion 612 in the fourth direction. The protrusion 63A extends in the fourth direction from a circumferential surface of the second accommodating portion 612.

The protrusion 63B is located away from the protrusion 63A in the second direction. The protrusion 63B is located on a side opposite to the protrusion 63A with respect to the toner discharge port 614 in the second direction. The protrusion 63B is located between the toner discharge port 614 and the protrusion 62B in the second direction. The protrusion 63B is located on a side opposite to the protrusion 63A with respect to the toner shutter 64 in the second direction. The protrusion 63B is located between the toner shutter 64 and the protrusion 62B in the second direction. The protrusion 63B is located on the side opposite to the first accommodating portion 611 with respect to the second accommodating portion 612 in the fourth direction. The protrusion 63B extends in the fourth direction from the circumferential surface of the second accommodating portion 612.

4.4 Toner Shutter 64

Figure 17:
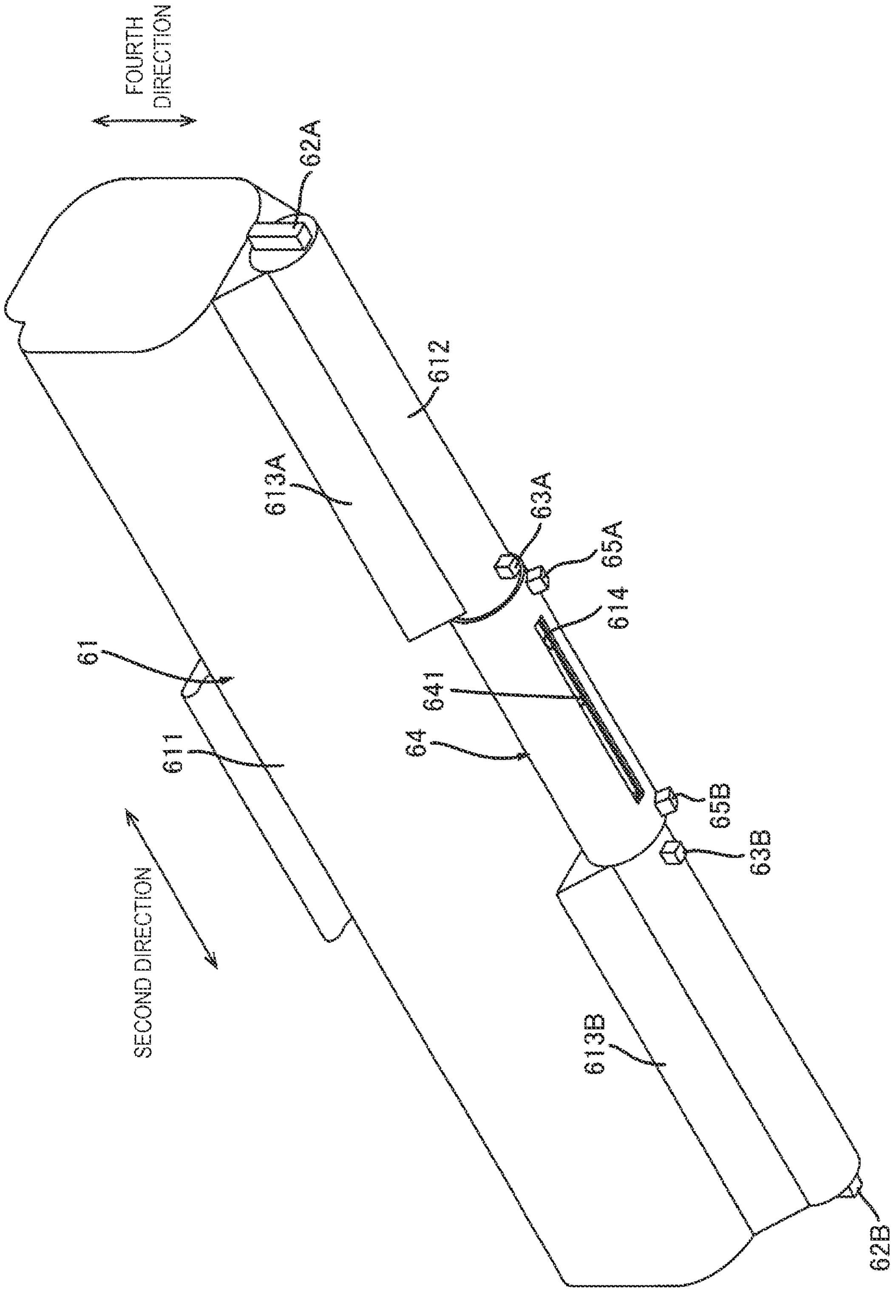
FIG. 17 is a perspective view of the toner cartridge shown in FIG. 14, showing a state where the toner shutter of the toner cartridge is located at an open position.

The toner shutter 64 is located between the connecting portion 613A and the connecting portion 613B in the second direction. The toner shutter 64 is located on the circumferential surface of the second accommodating portion 612. The toner shutter 64 is movable with respect to the toner discharge port 614 between a toner closed position (see FIG. 14) and a toner open position (see FIG. 17). As shown in FIG. 14, in a state where the toner shutter 64 is located at the closed position, the toner shutter 64 closes the toner discharge port 614. As shown in FIG. 16, in a state where the toner cartridge 6Y is mounted on the drum cartridge 5Y and the toner housing 61 is located at the toner unlock position, the toner shutter 64 is located at the toner closed position. As shown in FIG. 17, in a state where the toner shutter 64 is located at the open position, the toner discharge port 614 is opened. As shown in FIG. 15, in a state where the toner cartridge 6Y is mounted on the drum cartridge 5Y and the toner housing 61 is located at the toner lock position, the toner shutter 64 is located at the toner open position.

As shown in FIG. 14, the toner shutter 64 extends in the second direction. The toner shutter 64 has a cylindrical shape. The toner shutter 64 has an opening 641. The opening 641 extends in the second direction. In the state where the toner shutter 64 is located at the closed position, the opening 641 is located away from the toner discharge port 614. As shown in FIG. 17, in the state where the toner shutter 64 is located at the open position, at least a part of the opening 641 communicates with the toner discharge port 614.

4.5 Protrusions 65A, 65B

As shown in FIG. 14, the protrusion 65A is located on a circumferential surface of the toner shutter 64. The protrusion 65A extends from the circumferential surface of the toner shutter 64. The protrusion 65A is located between the opening 641 and the protrusion 63A in the second direction.

The protrusion 65B is located away from the protrusion 65A in the second direction. The protrusion 65B is located on a side opposite to the protrusion 65A with respect to the opening 641 in the second direction. The protrusion 65B is located on the circumferential surface of the toner shutter 64. The protrusion 65B extends from the circumferential surface of the toner shutter 64. The protrusion 65B is located between the opening 641 and the protrusion 63B in the second direction.

4.6 Toner Conveying Member 66

Figure 18:
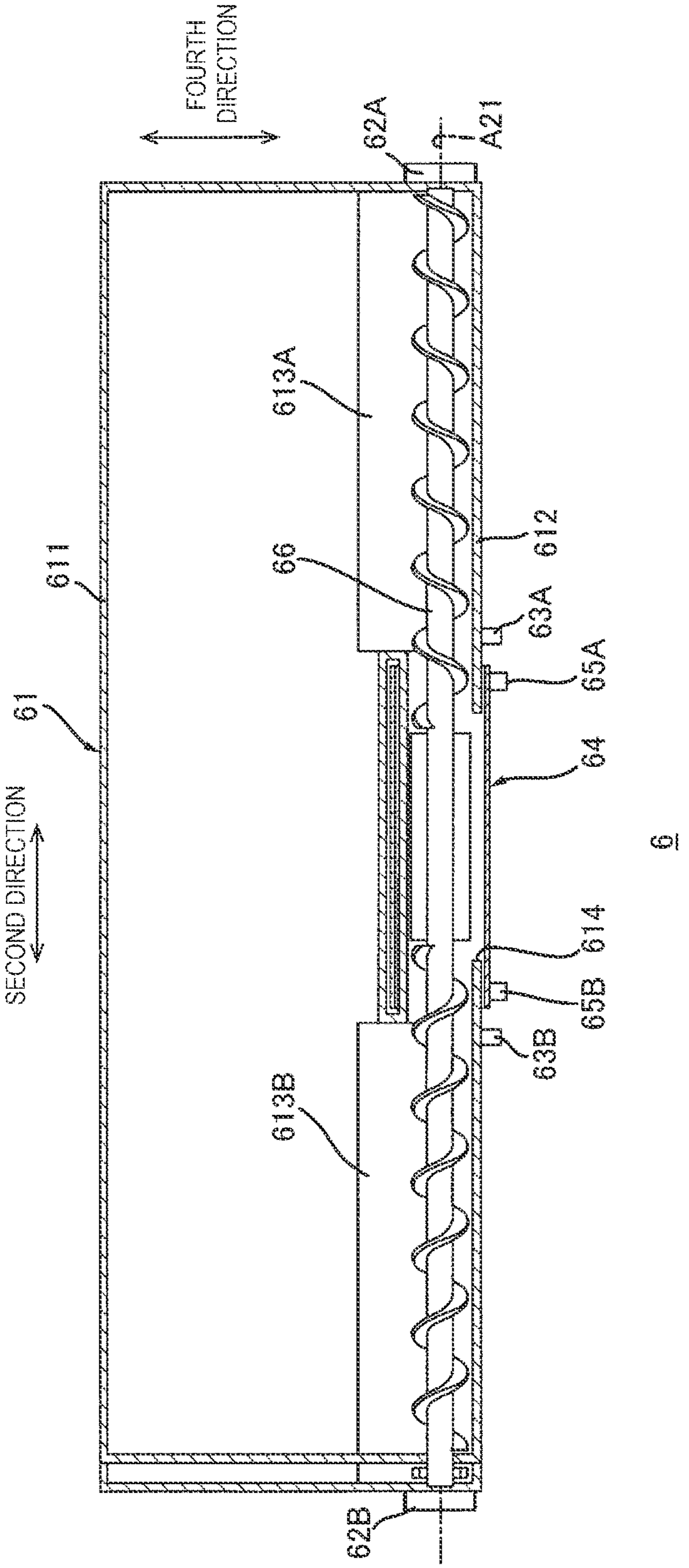
FIG. 18 is a cross-sectional view of the toner cartridge shown in FIG. 14, which is a cross-sectional view passing through a toner discharge port.

As shown in FIG. 18, a toner conveying member 66 is located in the second accommodating portion 612. The toner conveying member 66 is rotatable about an axis A21. The axis A21 extends in the second direction. The toner conveying member 66 extends along the axis A21. The toner conveying member 66 conveys the toner that has entered the second accommodating portion 612 through the connecting portion 613A and the toner that has entered the second accommodating portion 612 through the connecting portion 613B toward the toner discharge port 614.

5. Replacement Operation of Toner Cartridge 6Y

Replacement operation of the toner cartridge 6Y will be described with reference to FIGS. 3 and 10 to 16.

Figure 12:
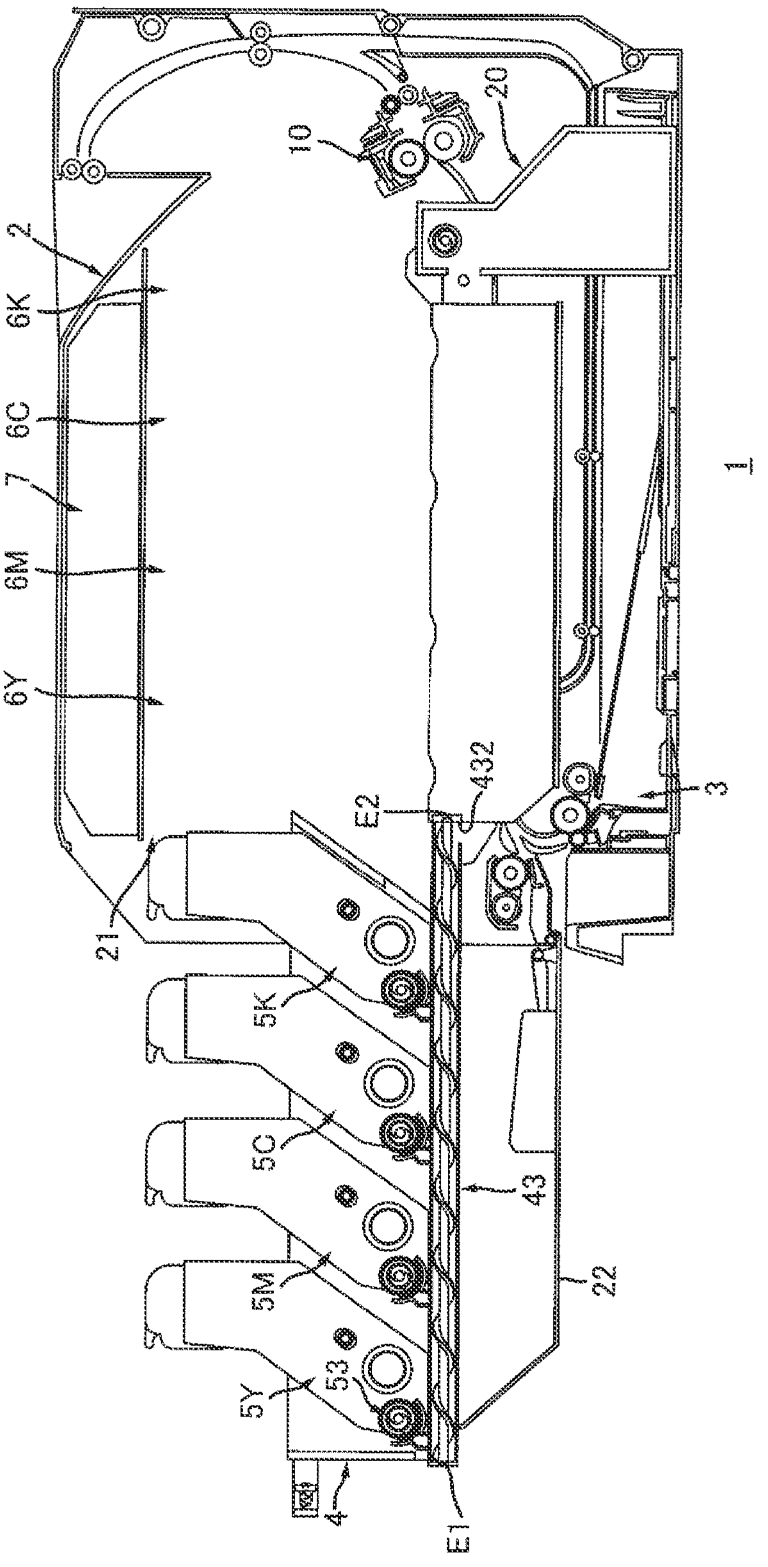
FIG. 12 shows a state where the drawer is located at the drawn-out position and the waste toner conveying pipe and the waste toner accommodating portion are disconnected.

As shown in FIGS. 11 and 12, in order to replace the toner cartridge 6Y, the operator first moves the drawer 4 from the accommodated position (see FIG. 11) to the drawn-out position (see FIG. 12).

In the state where the drawer 4 is located at the drawn-out position, the operation portion 45Y is located at the first position as shown in FIG. 13A. Since the operation portion 45Y is located at the first position, the lock member 42Y is located at the lock position as shown in FIG. 10. Since the lock member 42Y is located at the lock position, the drum cartridge 5Y is locked to the drawer 4.

Next, as shown in FIGS. 15 and 16, the operator moves the toner housing 61 from the toner lock position (see FIG. 15) to the toner unlock position (see FIG. 16).

Then, as shown in FIG. 16, in the state where the toner housing 61 is located at the toner unlock position, the toner shutter 64 of the toner cartridge 6Y is located at the closed position, and the toner shutter 514 of the drum cartridge 5Y is located at the closed position.

Next, the operator draws out the toner cartridge 6Y from the drum cartridge 5Y in the third direction. Then, the toner cartridge 6Y is detached from the drum cartridge 5Y. That is, in a state where the toner cartridge 6Y is mounted on the drum cartridge 5Y, the drum cartridge 5Y is mounted on the drawer 4, the drawer 4 is located at the drawn-out position, and the lock member 42Y is located at the lock position, the toner cartridge 6Y is detachable from the drum cartridge 5Y.

At this time, since the drum cartridge 5Y is locked to the drawer 4, movement of the drum cartridge 5Y in the third direction together with the toner cartridge 6Y can be prevented.

Accordingly, as shown in FIG. 12, when the toner cartridge 6Y is drawn out from the drum cartridge 5Y, disconnection between the waste toner discharge portion 53 and the waste toner conveying pipe 43 can be prevented.

Next, in order to mount the toner cartridge 6Y on the drum cartridge 5Y mounted on the drawer 4 located at the drawn-out position, the operator first fits the protrusion 62A (see FIG. 14) to the toner guide 512A (see FIG. 3) and fits the protrusion 62B (see FIG. 14) to the toner guide 512B (see FIG. 3).

Accordingly, the second accommodating portion 612 of the toner cartridge 6Y is guided toward the receiving portion 513 by the toner guide 512A and the toner guide 512B. As shown in FIG. 16, the second accommodating portion 612 is fitted to the receiving portion 513.

Then, the toner cartridge 6Y is supported by the drum cartridge 5Y. At this time, the toner housing 61 is located at the toner unlock position.

In a state where the toner cartridge 6Y is supported by the drum cartridge 5Y and the toner housing 61 is located at the toner unlock position, the protrusion 65A (see FIG. 14) is fitted to the hole 5132A of the receiving portion 513 (see FIG. 3) through the through hole 5142A of the toner shutter 514 (see FIG. 3), and the protrusion 65B (see FIG. 14) is fitted to the hole 5132B of the receiving portion 513 (see FIG. 3) through the through hole 5142B of the toner shutter 514 (see FIG. 3). By fitting the protrusion 65A to the hole 5132A of the receiving portion 513 and fitting the protrusion 65B to the hole 5132B of the receiving portion 513, the toner shutter 64 is fixed to the receiving portion 513.

The protrusion 63A (see FIG. 14) is fitted to the through hole 5143A of the toner shutter 514 (see FIG. 3), and the protrusion 63B (see FIG. 14) is fitted to the through hole 5143B of the toner shutter 514 (see FIG. 3). When the protrusion 63A is fitted to the through hole 5143A of the toner shutter 514 and the protrusion 63B is fitted to the through hole 5143B of the toner shutter 514, the toner shutter 514 becomes movable together with the toner housing 61.

Next, as shown in FIGS. 15 and 16, the operator moves the toner housing 61 from the toner unlock position (see FIG. 16) to the toner lock position (see FIG. 15). At this time, the toner housing 61 pivots with respect to the second accommodating portion 612.

Then, the toner shutter 64 is located from the closed position to the open position with respect to the toner housing 61 by movement of the toner housing 61 from the toner unlock position to the toner lock position. The toner shutter 514 moves from the closed position to the open position as the toner housing 61 moves from the toner unlock position to the toner lock position.

As shown in FIG. 15, when the toner housing 61 is located at the toner lock position, the toner shutter 64 is located at the open position and the toner shutter 514 is located at the open position. Accordingly, in a state where the toner cartridge 6Y is supported by the drum cartridge 5Y and the toner housing 61 is located at the toner lock position, the toner discharge port 614 communicates with the toner receiving port 5131. Accordingly, the toner receiving port 5131 can receive the toner discharged from the toner discharge port 614.

Next, the operator moves the drawer 4 from the drawn-out position to the accommodated position. Thereby, the replacement operation of the toner cartridge 6Y is completed.

6. Replacement Operation of Drum Cartridge 5Y

Next, replacement operation of the drum cartridge 5Y will be described with reference to FIGS. 6 to 13B.

The drum cartridge 5Y may be replaced in the state where the toner cartridge 6Y is mounted on the drum cartridge 5Y or may be replaced in a state where the toner cartridge 6Y is detached from the drum cartridge 5Y.

As shown in FIGS. 11 and 12, in order to replace the drum cartridge 5Y, the operator first moves the drawer 4 from the accommodated position (see FIG. 11) to the drawn-out position (see FIG. 12).

In the state where the drawer 4 is located at the drawn-out position, the operation portion 45Y is located at the first position as shown in FIG. 13A. Since the operation portion 45Y is located at the first position, the lock member 42Y is located at the lock position as shown in FIG. 10. Since the lock member 42Y is located at the lock position, the drum cartridge 5Y is locked to the drawer 4.

Next, as shown in FIGS. 13A and 13B, the operator moves the operation portion 45Y from the first position (see FIG. 13A) to the second position (see FIG. 13B).

Then, as shown in FIG. 9, in the state where the operation portion 45Y is located at the second position, the lock member 42Y is located at the unlock position, and the waste toner shutter 44Y of the drawer 4 is located at the closed position. As shown in FIG. 6, the waste toner shutter 54 of the drum cartridge 5Y is located at the closed position.

Next, as shown in FIG. 12, the operator draws out the drum cartridge 5Y from the drawer 4. Then, the engagement portion 55 of the drum cartridge 5Y (see FIG. 9) is disengaged from the groove 421 of the lock member 42Y (see FIG. 9), and the drum cartridge 5Y is detached from the drawer 4.

Next, in order to mount the drum cartridge 5Y on the drawer 4 located at the drawn-out position, as shown in FIG. 8, the operator first fits the cylindrical portion 516A to the guide 411Y of the drawer 4 and fits the cylindrical portion 516B to the guide 412Y of the drawer 4. Accordingly, the drum cartridge 5Y is mounted on the drawer 4 while being guided by the guide 411Y and the guide 412Y.

Then, as shown in FIG. 9, when the drum cartridge 5Y is mounted on the drawer 4, the engagement portion 55 of the drum cartridge 5Y is fitted to the groove 421 of the lock member 42Y.

Next, as shown in FIGS. 13A and 13B, the operator moves the operation portion 45Y from the second position (see FIG. 13B) to the first position (see FIG. 13A).

Then, as shown in FIG. 10, in the state where the operation portion 45Y is located at the first position, the lock member 42Y is located at the lock position, and the waste toner shutter 44Y of the drawer 4 is located at the open position. As shown in FIG. 7, the waste toner shutter 54 of the drum cartridge 5Y is located at the open position.

Then, in the state where the drum cartridge 5Y is mounted on the drawer 4, the waste toner discharge port 531 communicates with the waste toner receiving port 431Y (see FIG. 10). Accordingly, the waste toner receiving port 431Y is capable of receiving the toner discharged from the waste toner discharge port 531.

Next, the operator moves the drawer 4 from the drawn-out position to the accommodated position. Thereby, the replacement operation of the drum cartridge 5Y is completed.

7. Operational Effects (1) According to the image forming apparatus 1, as shown in FIG. 12, in a state where the drum cartridge 5Y is locked to the drawer 4, the toner cartridge 6Y can be replaced with respect to the drum cartridge 5Y mounted on the drawer 4.

Therefore, disconnection between the drum cartridge 5Y and the waste toner conveying pipe 43 during the replacement of the toner cartridge 6Y can be prevented.

As a result, leakage of the waste toner from the connecting portion between the drum cartridge 5Y and the waste toner conveying pipe 43 can be prevented.

As shown in FIGS. 9 and 10, the operator can open the waste toner receiving port 431Y of the waste toner conveying pipe 43 by moving the lock member 42Y from the unlock position (see FIG. 9) to the lock position (see FIG. 10). Therefore, the operator can perform operation of locking the drum cartridge 5Y to the drawer 4 and operation of opening the waste toner receiving port 431Y of the waste toner conveying pipe 43 by one action.

The operator can close the waste toner receiving port 431Y of the waste toner conveying pipe 43 by moving the lock member 42Y from the lock position (see FIG. 10) to the unlock position (see FIG. 9). Therefore, the operator can perform operation of unlocking of the drum cartridge 5Y from the drawer 4 and operation of closing the waste toner receiving port 431Y of the waste toner conveying pipe 43 by one action.

As a result, the operator can smoothly replace the drum cartridge 5Y.

(2) According to the image forming apparatus 1, as shown in FIGS. 9 and 10, in the state where the drum cartridge 5Y is mounted on the drawer 4 and the engagement portion 55 of the drum cartridge 5Y is engaged with the lock member 42Y, the waste toner shutter 54 of the drum cartridge 5Y (see FIGS. 6 and 7) moves from the closed position (see FIG. 6) to the open position (see FIG. 7) as the lock member 42Y moves from the unlock position (see FIG. 9) to the lock position (see FIG. 10).

Therefore, the operator can open not only the waste toner receiving port 431Y of the waste toner conveying pipe 43 but also the waste toner discharge port 531 of the drum cartridge 5Y by moving the lock member 42Y from the unlock position to the lock position. Accordingly, the operator can perform the operation of locking the drum cartridge 5Y to the drawer 4, the operation of opening the waste toner receiving port 431Y of the waste toner conveying pipe 43, and operation of opening the waste toner discharge port 531 of the drum cartridge 5Y by one action.

Further, in the state where the drum cartridge 5Y is mounted on the drawer 4 and the engagement portion 55 of the drum cartridge 5Y is engaged with the lock member 42Y, the waste toner shutter 54 of the drum cartridge 5Y (see FIGS. 6 and 7) moves from the open position (see FIG. 7) to the closed position (see FIG. 6) as the lock member 42Y moves from the lock position (see FIG. 10) to the unlock position (see FIG. 9).

Therefore, the operator can close not only the waste toner receiving port 431Y of the waste toner conveying pipe 43 but also the waste toner discharge port 531 of the drum cartridge 5Y by moving the lock member 42Y from the lock position to the unlock position. Accordingly, the operation of unlocking the drum cartridge 5Y from the drawer 4, the operation of closing the waste toner receiving port 431Y of the waste toner conveying pipe 43, and operation of closing the waste toner discharge port 531 of the drum cartridge 5Y can be performed by one action.

As a result, the operator can more smoothly replace the drum cartridge 5Y.

(3) According to the image forming apparatus 1, as shown in FIG. 15, in the state where the toner housing 61 is located at the toner lock position, the toner shutter 64 is located at the toner open position. As shown in FIG. 16, in the state where the toner housing 61 is located at the toner unlock position, the toner shutter 64 is located at the toner closed position.

Therefore, the operator can open the toner discharge port 614 by moving the toner housing 61 from the toner unlock position (see FIG. 16) to the toner lock position (see FIG. 15). Accordingly, the operator can perform operation of locking the toner cartridge 6Y to the drum cartridge 5Y and operation of opening the toner discharge port 614 by one operation.

The operator can close the toner discharge port 614 by moving the toner housing 61 from the toner lock position (see FIG. 15) to the toner unlock position (see FIG. 16). Accordingly, the operator can perform operation of unlocking the toner cartridge 6Y from the drum cartridge 5Y and operation of closing the toner discharge port 614 by one action.

As a result, the operator can smoothly replace the toner cartridge 6Y.

(4) According to the image forming apparatus 1, as shown in FIG. 8, the waste toner conveying pipe 43, the lock member 42Y and the waste toner shutter 44Y are located between the first side plate 41A and the second side plate 41B. The operation portion 45Y is located on a side opposite to the second side plate 41B with respect to the first side plate 41A. Therefore, the operator can easily access the operation portion 45Y from the side opposite to the second side plate 41B with respect to the first side plate 41A (that is, outside of the drawer 4).

Therefore, the operator can move the lock member 42Y between the first side plate 41A and the second side plate 41B (that is, inside of the drawer 4) from the outside of the drawer 4 by operating the operation portion 45Y.

As a result, the operator can easily move the lock member 42Y inside the drawer 4 from the outside of the drawer 4.

(5) According to the image forming apparatus 1, as shown in FIG. 8, when the drawer 4 located at the drawn-out position (see FIG. 2) moves to the accommodated position (see FIG. 1), the inner surface 231 of the receiving groove 23 comes into contact with the lever 451 of the operation portion 45Y located at the second position (see FIG. 11B) to move the operation portion 45Y located at the second position to the first position (see FIG. 11A).

Accordingly, the operation portion 45Y can be moved from the second position to the first position by using movement of the drawer 4 from the drawn-out position to the accommodated position.

Therefore, the operator can more smoothly replace the drum cartridge 5Y.

(6) According to the image forming apparatus 1, as shown in FIG. 11B, in the state where the operation portion 45Y is located at the second position, the length L2 of the lever 451 in the width direction is longer than the width W of the receiving groove 23 (see FIG. 8).

Therefore, the lever 451 of the operation portion 45Y located at the second position can be brought into contact with the inner surface 231 of the receiving groove 23.

8. Modification

The toner cartridge 6Y may be a developing cartridge including the developing roller 132Y. In this case, the drum cartridge 5Y does not include the developing device 13Y and the receiving portion 513.

What is claimed is:

1. An image forming apparatus comprising:

a main body housing;

a drum cartridge including:

a photosensitive drum;

a drum frame supporting the photosensitive drum;

an engagement portion; and a toner cartridge capable of accommodating toner to be supplied to the photosensitive drum, the toner cartridge being mountable on the drum cartridge; and a drawer movable between an accommodated position where the drawer is accommodated in the main body housing and a drawn-out position where the drawer is drawn out from the main body housing, the drum cartridge being mountable on the drawer, and the drawer including:

a lock member movable between a lock position where the lock member locks the drum cartridge to the drawer and an unlock position where the lock member unlocks the drum cartridge from the drawer, the lock member being engaged with the engagement portion in a state where the drum cartridge is mounted on the drawer; and an operation portion configured to be operated to move the lock member, the operation portion being movable between a first position where the lock member is located at the lock position and a second position where the lock member is located at the unlock position, wherein the drawer further includes:

a first side plate; and a second side plate located away from the first side plate, wherein the lock member is located on an inner surface of the first side plate, and wherein the operation portion is located on a side opposite to the second side plate with respect to the first side plate.

2. The image forming apparatus according to claim 1, wherein the engagement portion is a protrusion, and wherein the lock member has a groove to which the engagement portion is fitted in the state where the drum cartridge is mounted on the drawer.

3. The image forming apparatus according to claim 2, wherein the drawer includes a guide configured to guide mounting of the drum cartridge on the drawer, the guide extending in a guide direction, and wherein the groove extends in the guide direction in a state where the lock member is located at the unlock position, and extends in a direction intersecting with the guide direction in a state where the lock member is located at the lock position.

4. The image forming apparatus according to claim 1, wherein the engagement portion is movable together with the lock member by being engaged with the lock member.

5. The image forming apparatus according to claim 4, wherein the lock member is rotatable about a first axis, and wherein the engagement portion is rotatable about the first axis together with the lock member by being engaged with the lock member.

6. The image forming apparatus according to claim 1, wherein the toner cartridge includes a toner housing capable of accommodating the toner, and wherein in a state where the toner cartridge is mounted on the drum cartridge, the toner housing is rotatable between a toner lock position where the toner cartridge is locked to the drum cartridge and a toner unlock position where the toner cartridge is unlocked from the drum cartridge.

7. The image forming apparatus according to claim 6, wherein the toner housing has a toner discharge port through which the toner in the toner housing is capable of being discharged, wherein the toner cartridge further includes a toner shutter movable between a toner closed position where the toner shutter closes the toner discharge port and a toner open position where the toner discharge port is opened, and wherein the toner shutter is located at the toner open position in a state where the toner housing is located at the toner lock position, and is located at the toner closed position in a state where the toner housing is located at the toner unlock position.

8. The image forming apparatus according to claim 1, wherein the operation portion includes a lever rotatable about a second axis.

9. The image forming apparatus according to claim 8, wherein in a state where the operation portion is located at the first position, the lever extends in a moving direction of the drawer, and wherein in a state where the operation portion is located at the second position, the lever extends in a direction intersecting with the moving direction of the drawer.

10. The image forming apparatus according to claim 9, wherein the main body housing includes a contact portion that comes into contact with the lever of the operation portion located at the second position to move the operation portion located at the second position to the first position when the drawer located at the drawn-out position moves to the accommodated position.

11. The image forming apparatus according to claim 10, wherein the main body housing includes a receiving groove that receives the lever when the drawer moves between the accommodated position and the drawn-out position, the receiving groove extending in the moving direction of the drawer, and wherein the contact portion is an inner surface of the receiving groove.

12. The image forming apparatus according to claim 11, wherein in the state where the operation portion is located at the first position, a width of the receiving groove is longer than a length of the lever in a width direction of the receiving groove.

13. The image forming apparatus according to claim 12, wherein in the state where the operation portion is located at the second position, the length of the lever in the width direction of the receiving groove is longer than the width of the receiving groove.

14. The image forming apparatus according to claim 8, wherein the drawer further includes a stopper that stops the operation portion, which moves from the second position to the first position, at the first position.

15. The image forming apparatus according to claim 1, wherein in a state where: the toner cartridge is mounted on the drum cartridge; the drum cartridge is mounted on the drawer; the drawer is located at the drawn-out position; and the lock member is located at the lock position, the toner cartridge is detachable from the drum cartridge.

* * * * *